(12) United States Patent
Falash et al.

(10) Patent No.: US 10,685,582 B2
(45) Date of Patent: Jun. 16, 2020

(54) ADAPTIVE TRAINING SYSTEM, METHOD AND APPARATUS

(71) Applicants: Mark Falash, Sun City West, AZ (US); Eytan Pollak, Oviedo, FL (US); Michael Barnoske, Orlando, FL (US); George Rovny, Weatherford, TX (US); Coy Stewart, Carrollton, TX (US); Robert Ducharme, Bedford, TX (US)

(72) Inventors: Mark Falash, Sun City West, AZ (US); Eytan Pollak, Oviedo, FL (US); Michael Barnoske, Orlando, FL (US); George Rovny, Weatherford, TX (US); Coy Stewart, Carrollton, TX (US); Robert Ducharme, Bedford, TX (US)

(73) Assignee: L-3 Technologies, Inc., New York, NY (US)

( * ) Notice: Subject to any disclaimer, the term of this patent is extended or adjusted under 35 U.S.C. 154(b) by 52 days.

(21) Appl. No.: 15/702,372

(22) Filed: Sep. 12, 2017

(65) Prior Publication Data
US 2018/0075770 A1    Mar. 15, 2018

Related U.S. Application Data

(63) Continuation of application No. 14/366,616, filed as application No. PCT/US2014/022161 on Mar. 7, (Continued)

(51) Int. Cl.
*G09B 7/00* (2006.01)
*G09B 9/24* (2006.01)
(Continued)

(52) U.S. Cl.
CPC ............... *G09B 9/24* (2013.01); *G09B 5/065* (2013.01); *G09B 7/00* (2013.01); *G09B 9/02* (2013.01); *G09B 9/302* (2013.01)

(58) Field of Classification Search
CPC ... G09B 9/00; G09B 9/02; G09B 9/05; G09B 9/052; G09B 9/08; G09B 9/30; A61B 5/16; A61B 5/165
See application file for complete search history.

(56) References Cited

U.S. PATENT DOCUMENTS 4,683,891 A    8/1987  Cornellier et al.
5,287,489 A    2/1994  Nimmo et al.
(Continued)

FOREIGN PATENT DOCUMENTS

EP    0483991 A2    5/1992
EP    2439718 A1    4/2012
(Continued)

OTHER PUBLICATIONS

Richard C. Atkinson, "Adaptive Instructional Systems", Psychology and Education Series, Technical Report No. 24, Nov. 20, 1974, Stanford University, Stanford, California, http://suppes-corpus.stanford.edu/techreports/IMSSS_240.pdf.
(Continued)

*Primary Examiner* — Peter R Egloff
(74) *Attorney, Agent, or Firm* — Tiajoloff & Kelly LLP

(57) ABSTRACT

A system and method for training a student employ a simulation station that displays output to the student and receives input. The computer system has a rules engine operating on it and computer accessible data storage storing (i) learning object data including learning objects configured to provide interaction with the student at the simulation system and (ii) rule data defining a plurality of rules accessed by the rules engine. The rules data includes, for each rule, respective (a) if-portion data defining a condition of data and (b) then-portion data defining an action to be performed at the simulation station. The rules engine causes the computer system to perform the action when the condition of data is present in the data storage. For at least some
(Continued)

of the rules, the action comprises output of one of the learning objects so as to interact with the student. The system may be networked with middleware and adapters that map data received over the network to rules engine memory.

21 Claims, 19 Drawing Sheets

Related U.S. Application Data 2014, now Pat. No. 9,786,193, which is a continuation-in-part of application No. 14/118,877, filed as application No. PCT/US2012/053700 on Sep. 4, 2012, now Pat. No. 10,311,742.

(60) Provisional application No. 61/530,348, filed on Sep. 1, 2011.

(51) Int. Cl.
*G09B 5/06* (2006.01)
*G09B 9/30* (2006.01)
*G09B 9/02* (2006.01)

(56) References Cited

U.S. PATENT DOCUMENTS

| | | | |
|---|---|---|---|
| 6,035,737 A | 4/2000 | Babbitt et al. | |
| 6,186,794 B1 | 2/2001 | Brown et al. | |
| 6,206,700 B1 | 3/2001 | Cook et al. | |
| 6,427,063 B1 | 7/2002 | Cook et al. | |
| 6,606,479 B2 | 8/2003 | Cook et al. | |
| 6,915,104 B2 | 7/2005 | Yonezu et al. | |
| 7,016,888 B2 | 3/2006 | Slemmer et al. | |
| 7,052,277 B2 | 5/2006 | Kellman | |
| 7,467,121 B2 | 12/2008 | Hagelin | |
| 7,512,577 B2 | 3/2009 | Slemmer et al. | |
| 7,895,136 B2 | 2/2011 | Slemmer et al. | |
| 7,949,295 B2 | 5/2011 | Kumar et al. | |
| 8,113,844 B2 | 2/2012 | Huang et al. | |
| 8,170,976 B2 | 5/2012 | Dargue et al. | |
| 2003/0039948 A1 | 2/2003 | Donahue | |
| 2003/0233155 A1 | 12/2003 | Slemmer et al. | |
| 2004/0161731 A1 | 8/2004 | Arington et al. | |
| 2005/0243837 A1* | 11/2005 | Boyd | H04L 45/00 370/395.52 |
| 2005/0267731 A1 | 12/2005 | Hatcherson et al. | |
| 2005/0277099 A1 | 12/2005 | Van Schaack et al. | |
| 2006/0078856 A1 | 4/2006 | Kellman | |
| 2006/0195412 A1 | 8/2006 | Slemmer et al. | |
| 2007/0122778 A1 | 5/2007 | Beitel et al. | |
| 2008/0145830 A1 | 6/2008 | Huang et al. | |
| 2009/0035733 A1 | 2/2009 | Meitar et al. | |
| 2009/0099824 A1 | 4/2009 | Falash et al. | |
| 2009/0187519 A1 | 7/2009 | Slemmer et al. | |
| 2009/0208910 A1 | 8/2009 | Brueckner et al. | |
| 2010/0003659 A1 | 1/2010 | Edmonds | |
| 2010/0041007 A1 | 2/2010 | Wang | |
| 2010/0100520 A1 | 4/2010 | Dargue et al. | |
| 2010/0190142 A1 | 7/2010 | Gal et al. | |
| 2010/0190143 A1 | 7/2010 | Gal et al. | |
| 2010/0190145 A1 | 7/2010 | Singer et al. | |
| 2010/0217573 A1 | 8/2010 | Hatcherson et al. | |
| 2011/0076649 A1 | 3/2011 | Best et al. | |
| 2011/0121938 A1 | 5/2011 | Slemmer et al. | |
| 2011/0283866 A1 | 11/2011 | Hogan | |
| 2012/0007869 A1 | 1/2012 | Falash et al. | |
| 2012/0053915 A1 | 3/2012 | Falash et al. | |
| 2014/0186810 A1 | 7/2014 | Falash et al. | |
| 2014/0188574 A1 | 7/2014 | Luca | |
| 2015/0213730 A1 | 7/2015 | Brueckner et al. | |
| 2016/0017607 A1 | 4/2016 | Olsson et al. | |
| 2017/0032695 A1 | 2/2017 | Brueckner et al. | |
| 2017/0207982 A1 | 7/2017 | Olsson et al. | |

FOREIGN PATENT DOCUMENTS

| | | |
|---|---|---|
| KR | 10-2002-0030305 A | 4/2002 |
| KR | 10-2002-0090751 A | 12/2002 |
| RU | 48661 U1 | 10/2005 |
| WO | 2010044982 A1 | 4/2010 |
| WO | 2010-083563 A1 | 7/2010 |
| WO | 2013033723 A2 | 3/2013 |

OTHER PUBLICATIONS

Ok-Choon-Park, Jung Lee, "Adaptive Instructional Systems", Handbook of Research on Educational Communications and Technology, Chapter 25, Association for Educational Communications and Technology, http://learngen.org/~aust/EdTecheBooks/AECT%20HANDBOOK%202ND/25.pdf.
Small Business Innovation Research, "Adaptive Instructional Systems", U.S. Army Institute Rotary-Wing Aviation Research Unit, Fort Rucker, AL.
Third CLIPS Conference Proceedings, NASA Conference Publication, 10162, vol. I, Washington, D.C., NASA Center for AeroSpace Information, 1994.
Zhang, et al., "Program-level Adaptive Memory Management", ISMM'06, Jun. 10-11, 2006, Ottawa, Ontario, Canada, http://anon.cs.rochester.edu/u/zhangchl/publications/ismm06.pdf.
Ludwig, et al, "Develping an Adaptive Intelligent Flight Trainer", 2005, www.dtic.mil/cgi-bin/GedTRDoc?AD=ADA439799.
"Software to Detect Malfunctions in Anesthesia Equipment", NASA Tech Briefs, Lyndon B. Johnson Space Center, Houston, Texas, Aug. 1, 2000.
Espacenet English language abstract of KR 10-2002-0030305, published Apr. 25, 2002.
Espacenet English language abstract of KR 10-2002-0090751, published Dec. 5, 2002.
Dr. Painter et al. "General Aviation Pilot Advisory and Training System Semiannual Technical Progress Report", pp. 1-36, Sep. 16, 1997.
April Broomer, "CAE Simfinityυ Suite of Training Devices", retrieved Mar. 14, 2011.
"Publish-subscribe pattern". Jun. 24, 2013. XP055259129, Retrieved from the Internet: URL: https//en.wikipedia.org/w/index.php?title=Publish%E2%80%93subscribe_pattern&oldid=5671371806. Retrieved on Mar. 17, 2016.
Dr. Wallace et al. General Aviation Pilot 1-15 Advisory and Training System (GAPATS) Semiannual Technical Progress Report Contents. Sep. 16, 1997, pp. 1-36, XP055174341. Retrieved from the Internet: URL: http://ntrs.nasa.gov/archive/nasa/casi.ntrs.nasa.gov/19970034833.pdf. Retrieved on Mar. 17, 2016.

* cited by examiner

ADAPTIVE TRAINING SYSTEM, METHOD AND APPARATUS

PRIOR APPLICATIONS

This application is a continuation of U.S. patent application Ser. No. 14/366,616, which is a U.S. national stage of PCT/US2014/022161 filed Mar. 7, 2014, published as WO2015/134044 on Sep. 11, 2015, which is herein incorporated by reference in its entirety and which is a continuation-in-part of U.S. patent application Ser. No. 14/118,877 filed Nov. 19, 2013 as a U.S. national stage of international application PCT/US2012/053700 designating the U.S. and filed on Sep. 4, 2012, which was published as WO 2013/033723 A2, herein incorporated by reference in its entirety, and which claimed the benefit of U.S. provisional application Ser. No. 61/530,348 filed Sep. 1, 2011, which is herein incorporated by reference in its entirety.

FIELD OF THE INVENTION

This invention relates to computerized training systems, and more particularly computerized training systems where the computer administers the training. The preferable environment is a computerized system with associated devices that immerse students in emotionally engaging and functional operational environments throughout the learning experience, such as those relying on simulation for the training, e.g., for flight simulation or other vehicle simulator.

BACKGROUND OF THE INVENTION

Computerized training systems of many types exist. In the area of training in vehicle operation, these frequently employ a simulator station that emulates the actual vehicle, often accomplished using a dummy vehicle control panel with a simulated out-the-window scene visible to the trainee. The training takes place in a virtual environment created by a pre-programmed computer system.

Simulator systems are generally expensive and it is very desirable to make maximum use of each piece of hardware, to reduce the overall costs of the equipment for the training results conferred.

Known training systems provide the trainee with classroom lessons and computer based training (CBT) delivered by computer or by a human instructor, followed by an after-action review that is given to the trainee from which the effectiveness of the training on the trainee can be determined. If the assessment is not positive for the trainee having been effectively trained by the course of instruction, the computer system either repeats the instruction process for the trainee, or initiates a remedial process to bring the trainee up to an effective level. This rigid sequential process is repeated for all trainees who follow the identical sequence of instruction until the assessment indicates adequate effectiveness of the training.

This process can result in wasteful or inefficient and costly use of the training resources, e.g., the simulator, because the varying skill levels of the trainees, and varying effectiveness of the course of instruction on each trainee. The most advanced student or trainee may be exposed to steps of training for less difficult aspects of the training, making that trainee bored, and also wasting the training time by trying to teach things that the trainee already knows. On the other hand, a less expert, moderately-skilled individual may be given additional instruction that is not necessary while at the same time being given less instruction in certain areas where he requires additional instruction and training, resulting in more repeat work. Finally, there is the very low-skilled trainee that needs to learn virtually everything, and has difficulties with addressing some of the more difficult aspects of the training, possibly missing basics, and therefore being unable to benefit from the remainder of the more advanced segment of the instruction set.

Similarly, different courses of training may have differing effectiveness depending on the nature of the trainees. As a result, training methods that are not effective for a given trainee may be administered, and their lack of effectiveness can only be determined after the training system has been occupied for a full instruction session.

For the foregoing reasons, current learning systems are not making efficient use of the available hardware and computer support systems and personnel.

SUMMARY OF THE INVENTION

It is accordingly an object of the present invention to provide a computerized learning system, such as a computerized simulation system, in which a trainee is efficiently provided with instructions that are appropriate to his skill level and his personal learning parameters as they are determined by the assessment of the ongoing instruction or by prior identified learning preferences of the trainee. Preferably, the system supports self-paced learner-driven discovery while continuously targeting the learner's KSA (Knowledge, Skill, Ability) gap. The system may rely on full simulation, which may be real (i.e., using a real device in the training for its use), simulated (as with touch screen I/O devices that emulate the device being trained for) or based on a model (or dummy copy) of the device or devices, the use of which is being trained.

According to an aspect of the invention, a system for training a student comprises a simulation station configured to interact with the student and a computer system. The simulation system displays output to the student via at least one output device and receives input via at least one input device. The computer system has a rules engine operative on it and computer accessible data storage operatively associated with it and storing (i) learning object data including a plurality of learning objects each configured to provide interaction with the student at the simulation system, and (ii) rule data defining a plurality of rules accessed by the rules engine. The rules data includes, for each rule, respective (a) if-portion data defining a condition of data and (b) then-portion data defining an action to be performed at the simulation station. For at least some of the rules, the respective action comprises output of a respective one of the learning objects so as to interact with the student. The rules engine causes the computer system to perform the action when the condition of data is present in the data storage.

According to another aspect of the invention, a method for providing computerized training to a student comprises providing a simulation station connected with a computer system with computer-accessible data storage supporting a rules engine thereon. Lesson data is stored in the data storage so as to be accessed by the rules engine. This lesson data comprises learning object data defining a number of learning objects that each, when activated by the rules engine, cause the simulation station to output visual imagery, audio or other output, and rules data defining a plurality of rules on which the rules engine operates so as to administer the computerized training.

The rules each have a data condition part and an action part. The data condition part defines a state of data in the data storage that, when present, causes the rules engine to direct the computerized system to take a predetermined action. At least some of the actions comprise activating at least some of the learning objects to interact with the student at the simulation station.

Student state data is also stored in the data storage. The student state data includes data defining an assessment measure of training of the student.

The computerized training is provided to the student at the simulation station with the rules engine administering the training according to the rules stored in the data storage. The assessment measure for the student is determined repeatedly or continually based on input received from the student at the simulation station, and the determined assessment measure is stored in the student state data. The rules data defines at least one rule that initiates the action thereof when a data condition that the student state data in the data storage defines an assessment measure below a predetermined value is present, and the action includes initiating operation on the simulation station of one of the stored learning objects.

According to another aspect of the invention, objects of the invention are accomplished using a computerized training interface system having input and output capabilities, and a computerized system connected with it that preferably operates using an inference engine or a rules engine. The rules engine is programmed with a set of rules as will be described herein that allow it or enable it to administer flexibly the training of a trainee in an immersive training station.

An Intelligent Decision Making Engine (IDME) is a data-driven computer system, preferably a rule based inference engine implemented using rules software, such as the Drools Expert software package from JBoss, a subsidiary of Red Hat, or a CLIPS software package, which is available as open-source public domain software, that implements actions or procedures responsive to specified qualities of data being stored. The rules are continuously active once loaded, and are configured to allow for continuous adaptive modification of any instruction and other interactions with the trainee of the training station in real time, an interactive adaptive learning system, as will be described herein. The CLIPS software and its operation are described inter alia in the Third Conference on CLIPS Proceedings (Electronic Version) available publicly at http://clipsrules.sourceforge.net/documentation/other/3CCP.pdf, NASA Conference pub. 10162 Vol. 1 (1994), which is herein incorporated by reference in its entirety.

Because the use of a rules engine makes the reaction to changes in the data immediate, the adaptive process of the invention is especially efficient at delivering training. It may be said that the rules engine system provides for a higher-resolution or finer-grain adaptive learning than is available in the prior art due to the immediacy of the reaction of the rules-based system.

The organization of rules is prepared by the training staff, and generally provides for at least one of
(1) remedial instruction action when there is an indication of failure or ineffectiveness of the training,
(2) increased training difficulty when the assessment indicates that the trainee has too high a level of ability for the immediate level or subject matter of the training, and
(3) an adjustment of type of training to better address the training requirements of the individual trainee.

These assessments and changes are executed continuously as the instruction progresses, and as soon as any indication of inefficiency of use of the resources is present in the data base of the rules engine. The continuous performance assessment targets the individual learner lesson adaption to the state of the learner. The complexity and pace of the lesson are adapted to regulate learner engagement and maximize learning and retention.

According to a preferred embodiment of the invention, a training station and a computer system with the rules engine are connected by a network operating pursuant to communications software that controls the communication on the network such that computers on the network publish data that is transmitted only to other computers on the network that have subscribed to receive data from the publishing computer. The rules engine computer system subscribes to receive data published by the training system, and stores data received from it in the computer accessible data storage, so that rules of the rules engine computer system have if-portions based on the received data.

Other advantages and objects will become obvious from the present specification.

DETAILED DISCLOSURE

Figure 1:
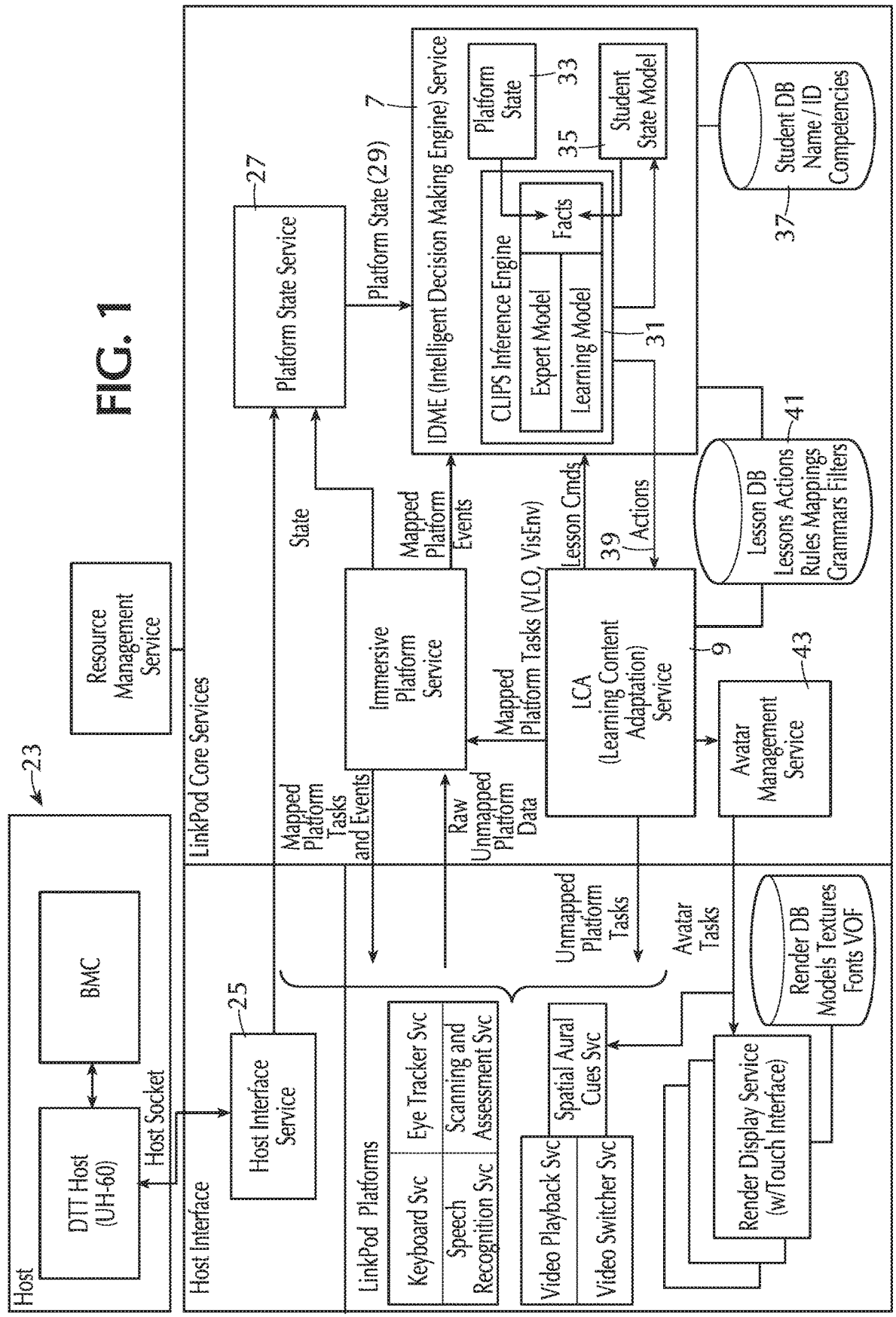
FIG. 1 is a schematic view of the overall simulation system according to the invention.

FIG. 1 shows a diagram of an embodiment of the system architecture of the computer system controlling the operation of a LinkPod™ training system, which may be used for a variety of training purposes, especially for training in operation of vehicles, such as a flight simulator. It will be understood that many different systems and types of computer hardware and software with varied designs and components may be used advantageously in the invention as training systems.

The system is implemented in a computer system, which may comprise one computer or a plurality of computers linked by a network or local connection over which system operation is distributed. The computer system or systems may run operating systems such as LINUX or Windows, and their operations are controlled by software in the form of computer-executable instructions stored in computer-accessible data memory or data storage devices, e.g., disk drives. The computers also include typical computer hardware, i.e., a central processor, co-processor or multi-processor, memory connected to the processor(s), and connected devices for input and output, including data storage devices that can be accessed by the associated computer to obtain stored data thereon, as well as the usual human operator interfaces, i.e., a user-viewable display monitor, a keyboard, a mouse, etc.

The databases described herein are stored in the computer-accessible data storage devices or memory on which data may be stored, or from which data may be retrieved. The databases described herein may all be combined in a single database stored on a single device accessible by all modules of the system, or the database may be in several parts and stored in a distributed manner as discrete databases stored separate from one another, where each separate database is accessible to those components or modules of the system that require access to operate according to the method or system described herein.

Figure 2:
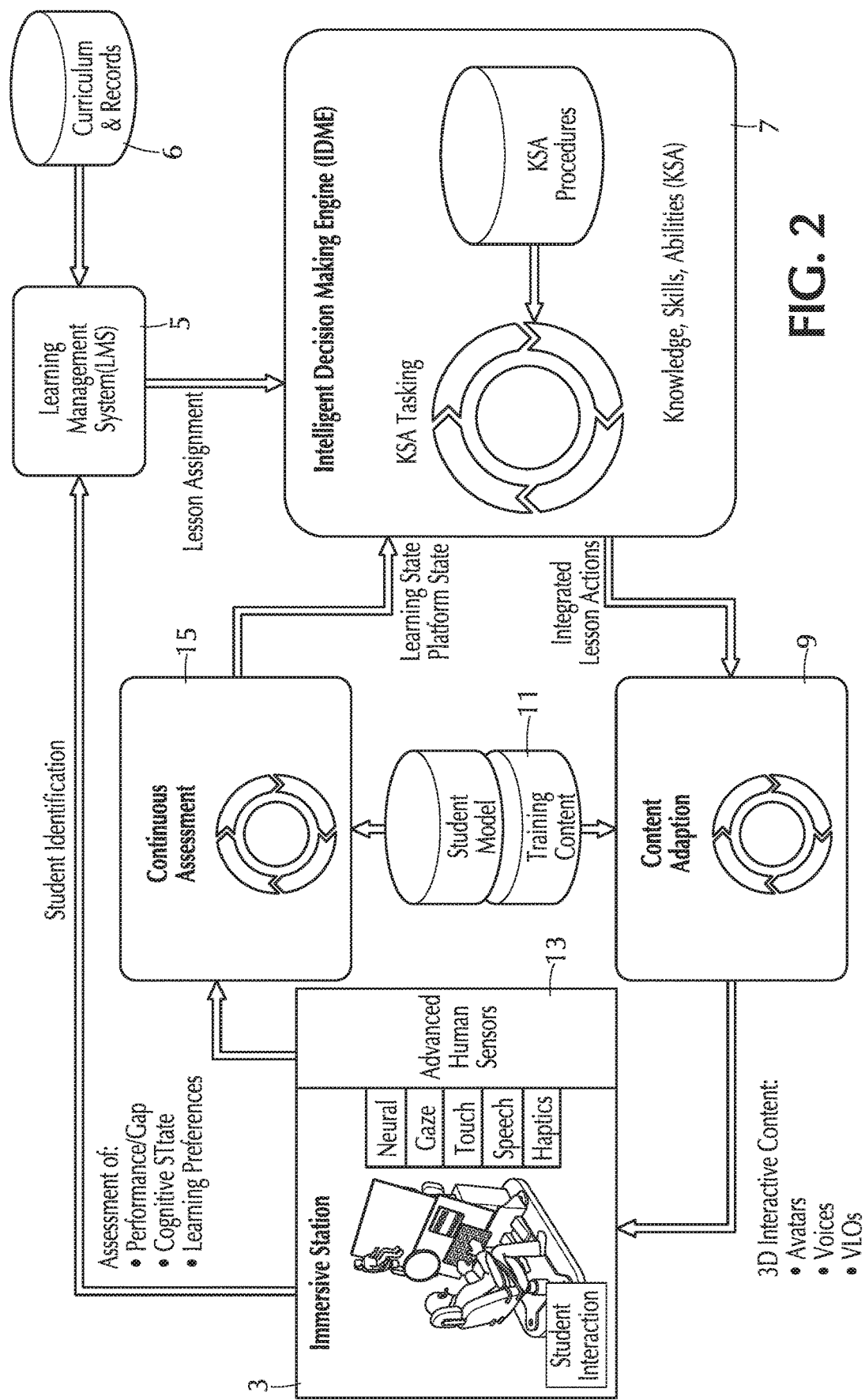
FIG. 2 is a schematic view of the internal operation of a training system according to the invention.
Figure 5:
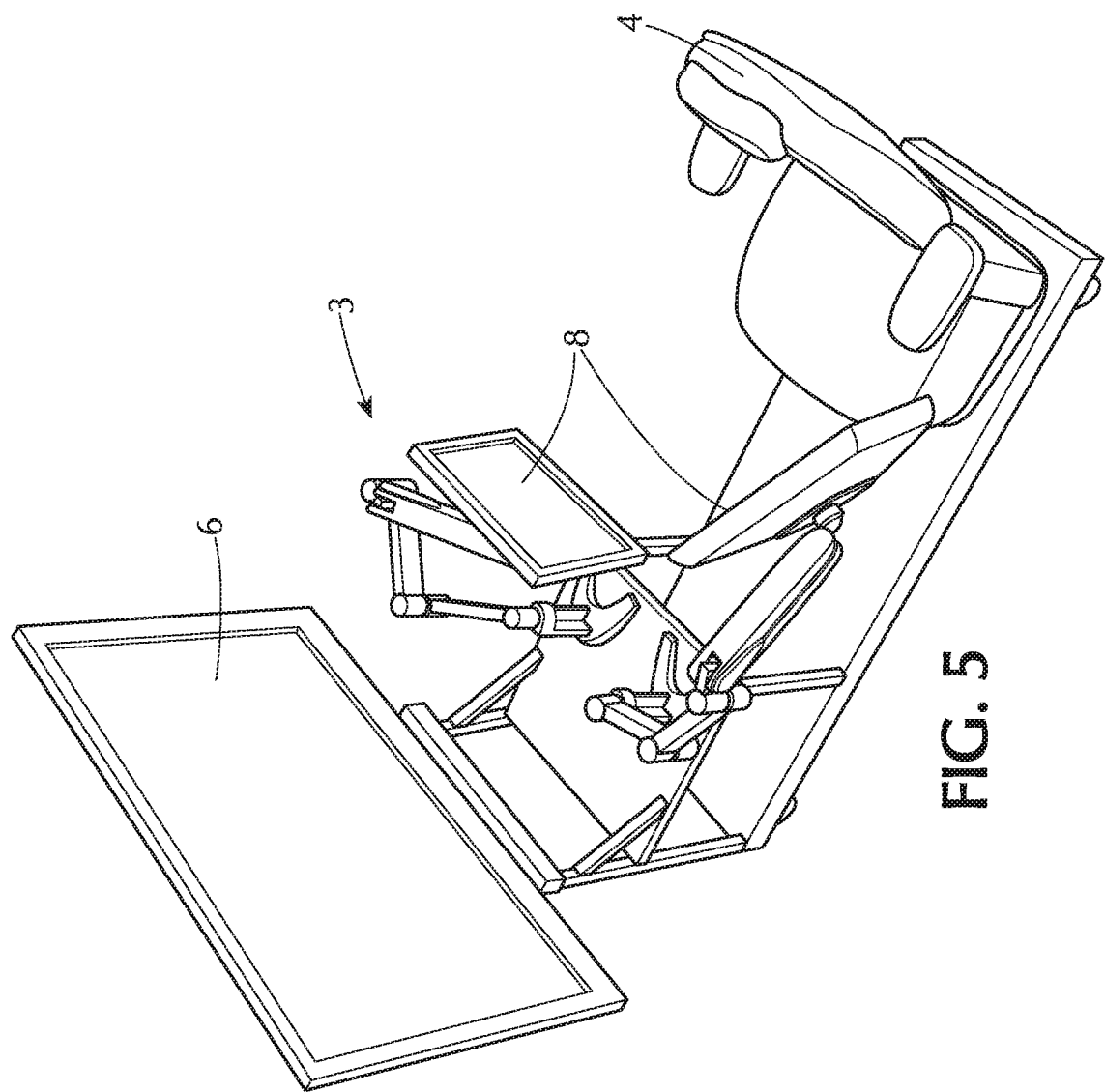
FIG. 5 is a perspective view of an exemplary simulation system using the present invention.

Referring to FIG. 2, the overall LinkPod™ system comprises an immersive station 3, which is an adaptable training station with a number of input and/or output devices accessible by user. Referring to FIG. 5, the immersive station 3 in the preferred embodiment comprises a seat 4 for a user and displays, including a larger 3D HDTV resolution display 6 and two or more touch sensitive I/O screens 8 supported for adjusting movement. The touch screens can be used to display a cockpit of any vehicle or the specific device the training is for, so the station 3 can be used for a variety of possible training courses for a variety of different vehicles or aircraft. The immersive station 3 also has an eye tracker that detects the direction that the trainee is looking in and generates a data signal carrying that information. All the displays 6 and 8 are connected with and controlled by a local computer system that supports the immersive station 3 as a platform. The base of the station 3 is a frame supported on casters, which allow for easy movement of the station 3 as desired.

Figure 4:
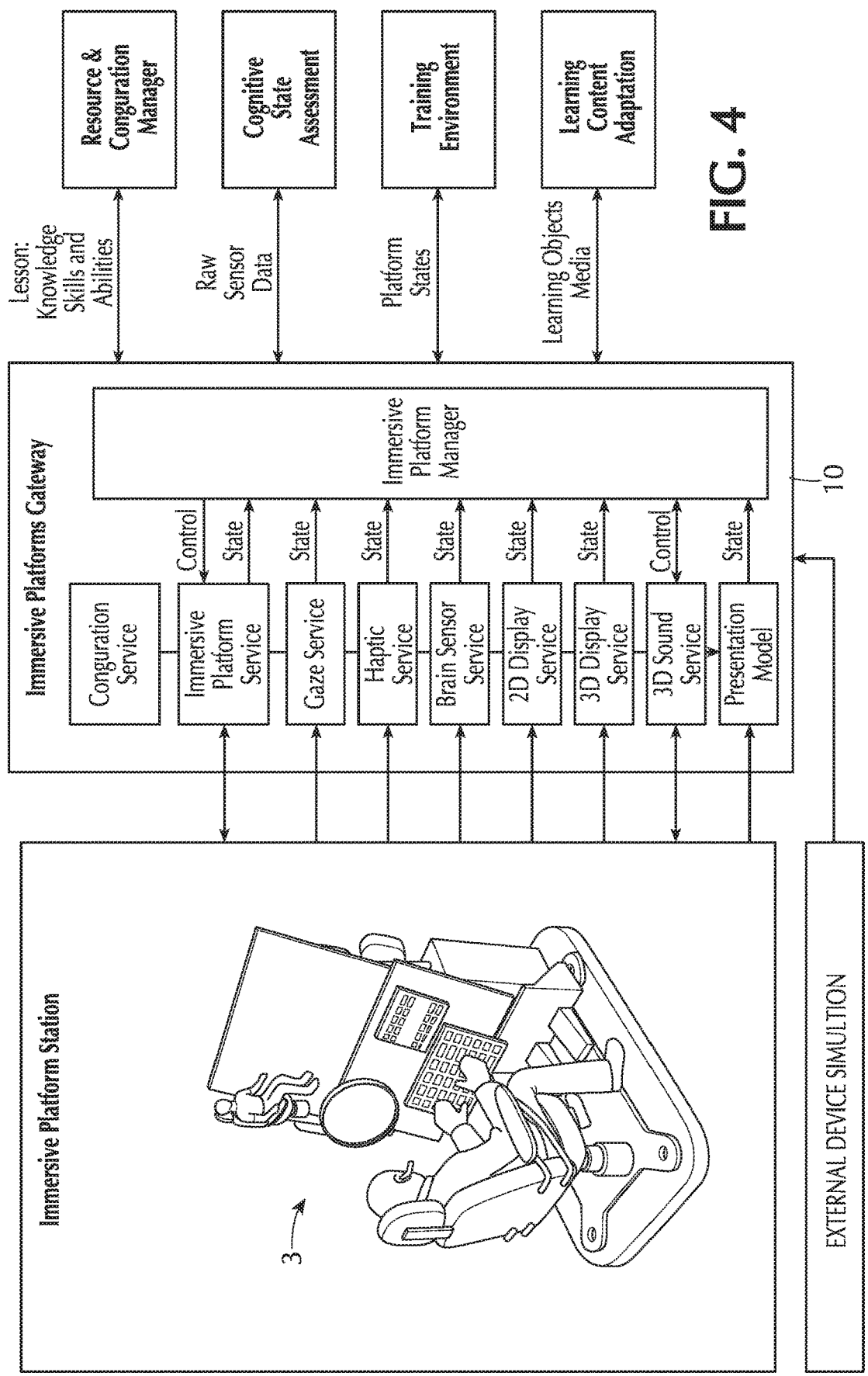
FIG. 4 shows an example of an immersive platform station for use as the training station for the invention, together with a schematic illustration of the peripheral devices attached thereto and the associated software support from the computer controlling system.

As illustrated in FIG. 4, the immersive platform station computer system 10 runs an immersive platform manager software module 14, which operates a selected configuration of the trainee station 3. The platform support includes support of the main display 6, the interactive displays 8, the eye tracker or gaze detector, a haptic system, a brain sensor system, which can detect certain neurological parameters of the trainee relevant to the training, sensors that can detect the trainee's posture, any other biometric sensors that may be desirable to monitor the physical condition of the trainee, and also a 3D sound system, and a microphone, and any other hardware that is desired for trainee station. The various components of the system return electrical signal data that is processed by platform manager 10 and transmitted to other modules of the system.

It will be understood that a plurality of immersive stations 3 can be supported in parallel by a system according to the invention.

The immersive station 3 is electronically connected by a network data link or local connection with a computerized learning management system (LMS) 5. Generally, the LMS 5 is supported on a separate computer system via a network, and it may be connected to a number of training stations 3 locally or remote from its location. The LMS stores data, including videos and other information and media files used in the lessons, as well as data defining the students that use the system and data relating to administration of training with the various training stations 3 connected therewith via one or more networks or the Internet. The LMS is similar to training management systems known to those of skill in the art, in that it communicates with the immersive station 3 so as to display a prompt and it receives student log-in identification data, typically comprising an ID and a password, from the immersive station 3 entered by the trainee through an interactive screen 8 at the immersive station 3. The LMS then lists the possible courses of instruction available to the trainee, and receives a responsive communication through the interactive device 8 that selects a course. The LMS then loads the respective training station 3 with the necessary training data resources, media, software that supports hardware needed for the specific training selected, and other data as will be described herein, and also and initiates the system of the training station to present the course to the trainee.

Referring to FIG. 2, LMS 5 is connected with and accesses stored curriculum and records database 6. This database contains the data needed to administer training in the system, including history of the student or students. Selection of a course of training responsive to trainee log-in and other selection input, causes the LMS to load the requisite lessons, rules, and other data into the appropriate data storage or memory so as to be accessible by the components of the system that are involved in delivery of training at the immersive station 3.

The system further includes an intelligent decision making engine (IDME) indicated at 7. Learning management system 5 communicates internally with IDME 7, which in the preferred embodiment is a rules-based inference engine supported on a computer system in the training station 3. The IDME rules run via an API of CLIPS rules-engine software running on the host computer. The IDME 7 has computer accessible memory that is loaded by the LMS 5 with the rules needed for the specific selected training operation.

Preferably, the IDME has access to a database shared with other components of the system that contains training data, as will be described herein.

The IDME rules engine operates according to a set of rules that are loaded into the associated storage or memory so as to be accessible by the IDME. Each rule specifies a condition of data in the associated database, if the data value of a current measure of effectiveness for the current trainee is below a predetermined threshold value, etc. The rule also specifies an action that is to be taken whenever that condition of data is satisfied, such as, e.g., to display a question to the trainee and wait for a response. The rules engine is a data-driven system, in that the state of the data in the associated database immediately triggers prescribed actions when it satisfies the condition of the rule. As such, the set of rules loaded in the IDME all operate continuously and simultaneously based on the state of data accessible to the IDME, and the rules trigger actions that will be taken in the training process at the immersive station 3 at whatever point in time the associated data condition of the rule is met.

When the rules dictate, the IDME 7 passes, sends or otherwise transfers data to a content adaption module 9 that corresponds to actions, i.e., commands to perform integrated lesson actions.

Content adaption module 9 is also implemented using a software system running on a computer, and the IDME and the content adaption module 9 may be both supported on the same computer. Content adaption module 9 also has access to a data storage device 11 storing data containing training content, e.g., materials, recorded instruction and various other software and data that is used in providing simulation or training to the user at station 3, and it controls the operation of the instruction and/or simulation conducted at immersive station 3. In particular, the content adaption module 9 causes the immersive station displays and sound system to output multimedia training content, such as avatars delivering audible content, voice instruction, and other actions. Those other actions include interfacing with an external simulation or live device running a computerized simulation of the vehicle of the training by displaying the correct controls on the interactive screens and with an appropriate display on the main display 6 created by a computerized image generator, not shown, that renders real-time video based on virtual scene data, as is well known in the art of flight or other vehicle simulation.

Content adaption module 9 uses training content 11 to provide to immersive station 3 the necessary training events. As the training proceeds, the various trainee sensors and input devices generally indicated at 13, e.g., eye-tracking, gaze or blink detection, neural detectors, touchscreens or other touch-based simulated control panel or cockpit input/output devices, a microphone listening for speech, and optionally detectors from which body position or posture may be detected, detect actions or conditions of the trainee and transmit data therefrom to continuous assessment module 15.

The continuous assessment module 15 is also implemented using a software system running on a computer. Preferably, the IDME and the continuous assessment module 15 are both supported on the same computer located geographically at the simulation station 3. The assessment module 15 may be independent of the IDME, or more preferably, the assessment module 15 may be constitute as set of Assessment Rules (see FIG. 10) incorporated into the rules data as a subset of the total rules data on which the IDME operates. As rules data, the assessment activities may be seamlessly interwoven with the activation of learning objects transmitting output that triggers input of the trainee that may be used to assess a measure of performance (MOP) of the student, or a measure of effectiveness (MOE) of the training as it is given.

Continuous assessment module 15 provides continuous assessment of the trainee such as by analysis of responses or activities of the trainee at the immersive station 3. The continuous assessment module 15 generally produces data that is an assessment of the knowledge, skill and ability (KSA) of the trainee. Knowledge is the retention by the trainee of certain information necessary to operate the vehicle, e.g. the location of the switch for the landing gear on an aircraft. Skill is the use of knowledge to take some action, e.g., to operate the landing gear properly in simulation. Ability is the application of knowledge and/or skill to operate properly in a more complex mission scenario, such as in a simulation using the knowledge and skill.

A variety of techniques may be employed to determine KSA values for the trainee. For instance, the assessment module 15 can assess the trainee based on frequency of errors and correct actions in a simulation exercise, with corresponding weighting or scoring factors from severe errors at −5 to perfect operation at +5. Assessment can also be based on the trainee's visual scan pattern using techniques such as Hidden Markov Model (HMM) to assess the trainee's skill level while executing tasks. Interactive quizzes or pop-up questions may also be employed, where the response is either a verbal response picked up by a microphone or selection of a multiple choice question response through some other input device such as a touchscreen. Some biometrics may be used as well.

The KSA assessments made by the continuous assessment module 15 are stored as data in a student state data area in a database accessible to both the continuous assessment module 9 and the IDME 7. It will be understood that the student state data may be numerical values linked to identify the associated area of knowledge, skill or ability, and may be a flag of 1 or 0 indicative of the presence or absence in the student of the knowledge, skill or ability, or a numerical variable in a range that is indicative of the degree of presence of the KSA quality, e.g., a score from a test on a scale of 0 to 100, or may be a string of characters that is indicative of some level of KSA or expertise of the student, e.g., with respect to successful completion of some aspect of training, a "YES" or "NO", or a detailed definition of a familiarity with an instructional area, any character string, e.g., "BEGINNER", "EXPERT", or "BASIC", etc.

Also stored in the shared database area is platform state data that defines the current state of the platform, and is indicative of what training is being displayed or the status of the delivery of training to the trainee on the immersive station 3. This data may also be numerical or character strings.

Generally, the rules of the IDME define conditions for action that are based on the student state data or the platform data. The rules cause the system to react to the data produced by the continuous assessment so that the immediate decision making of the system improves the efficacy and efficiency of the use of the simulation device or immersive station 3.

Figure 3:
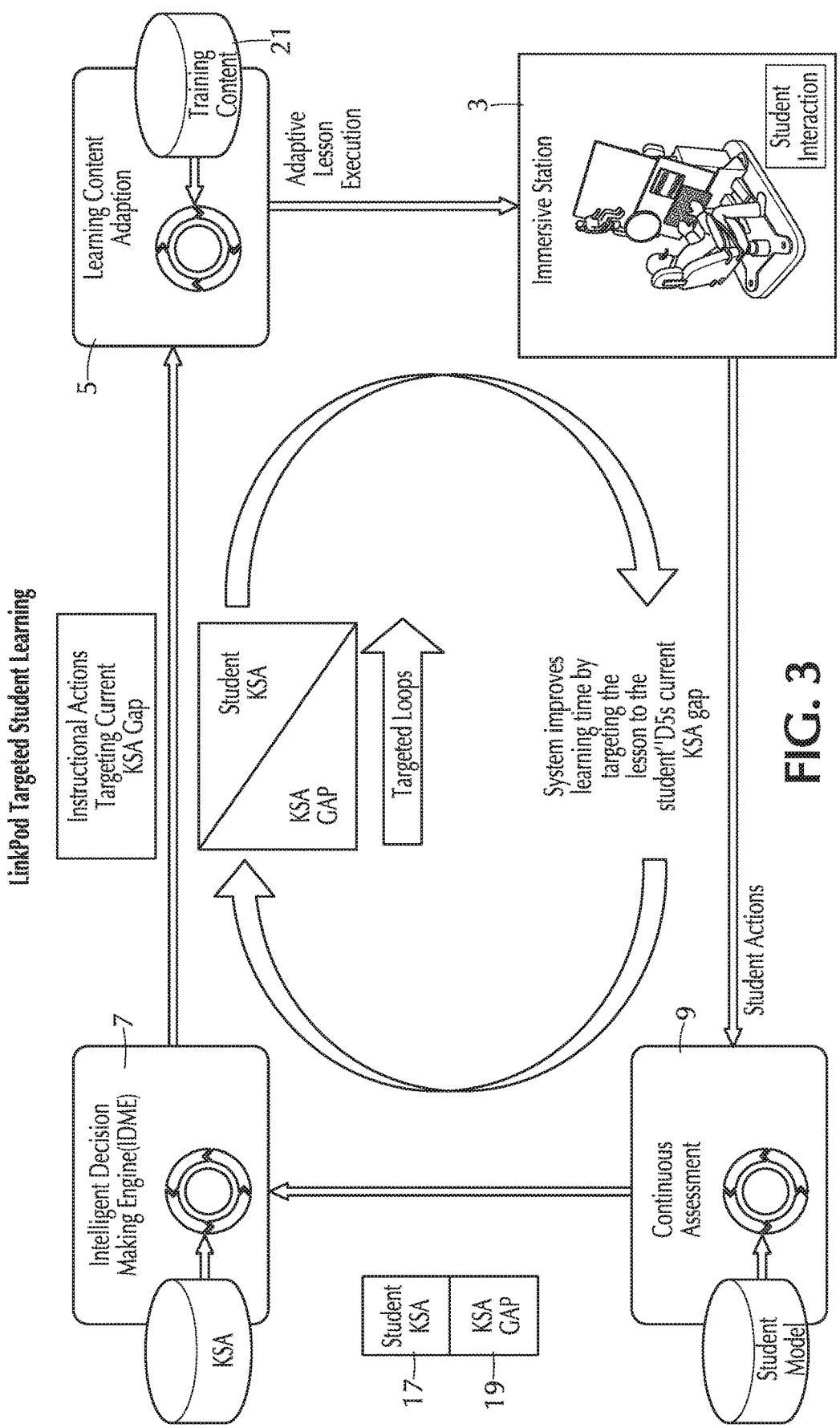
FIG. 3 is a more detailed schematic view of the operation of the computerized simulation system of the invention.

Referring to FIG. 3, a more detailed illustration of the operation of the system is shown. As described above, immersive station 3 is occupied by a student that interacts with the immersive station 3. Student actions at the immersive station 3 are processed by continuously-running assessment program 9. The assessment program continuously or continually develops an assessment of the knowledge, skill and ability (KSA) of the student from the student actions, and also from the stored LMS model of the student, which has already been obtained or supplied to the system or developed over time to derive, and defines certain training attributes of the trainee, such as whether the trainee is better trained by visual or auditory instruction.

From all of these inputs or student actions, the continuous assessment determines the student KSA 17. The student KSA is compared to a desired or required level of KSA appropriate to the level of instruction or simulation that the student is receiving. The difference between the desired KSA value and the actual student KSA may be referred to as a KSA gap 19, this being either a quantified value or a value that can be derived from the determined student KSA and compared with the specific expectations of the student as pre-determined by data in the system.

The student KSA is part of the student state data that is available to the IDME 7, and as such the rules are preferably written so as to take instructional actions targeting the current KSA gap of the trainee. As has been stated above, the IDME rules operate continuously, and they take instructional actions immediately based on the data in reaction to the KSA gap or KSA values, providing optimal training directed at the areas where the trainee requires instruction.

The instructional actions are sent from the IDME 7 to the learning content adaptation module 5. The learning content adaptation module 5 accesses training content data stored on a computer accessible data storage device 21 and this material is transmitted to the immersive station 3, adjusting the training of the trainee.

A rule is composed of an if portion and a then portion. The if portion of a rule is a series of patterns which specify the data that cause the rule to be applicable. Commonly, as is known in the art, the pattern that is satisfied is a Boolean or mathematical condition, e.g., if x=0, or if x=1, and z<50, or student_level=EXPERT, that is either present in the data or absent. The then portion of a rule is the set of actions to be executed when the rule is applicable, i.e., when the if portion of the rule is present in the database.

The inference engine or IDME 7 automatically matches data against predetermined patterns and determines which rules are applicable. The if portion of a rule is actually a whenever portion of a rule, because pattern matching occurs whenever changes are made to the data associated with the IDME. The inference engine selects a rule, and if the data conditions of the if portion are present in the data, then the actions of the then portion of the selected rule are executed. The inference engine then selects another rule and executes its actions. This process continues until no applicable rules remain.

The if portion, or the contingent data precondition portion, of each of the rules may be any aspect of the data student state or the platform state. The then portion of the rule may include action to be taken in response to the satisfaction of the conditional requirement for the student or platform data may be any action that can be done by the immersive station 3.

Figure 6:
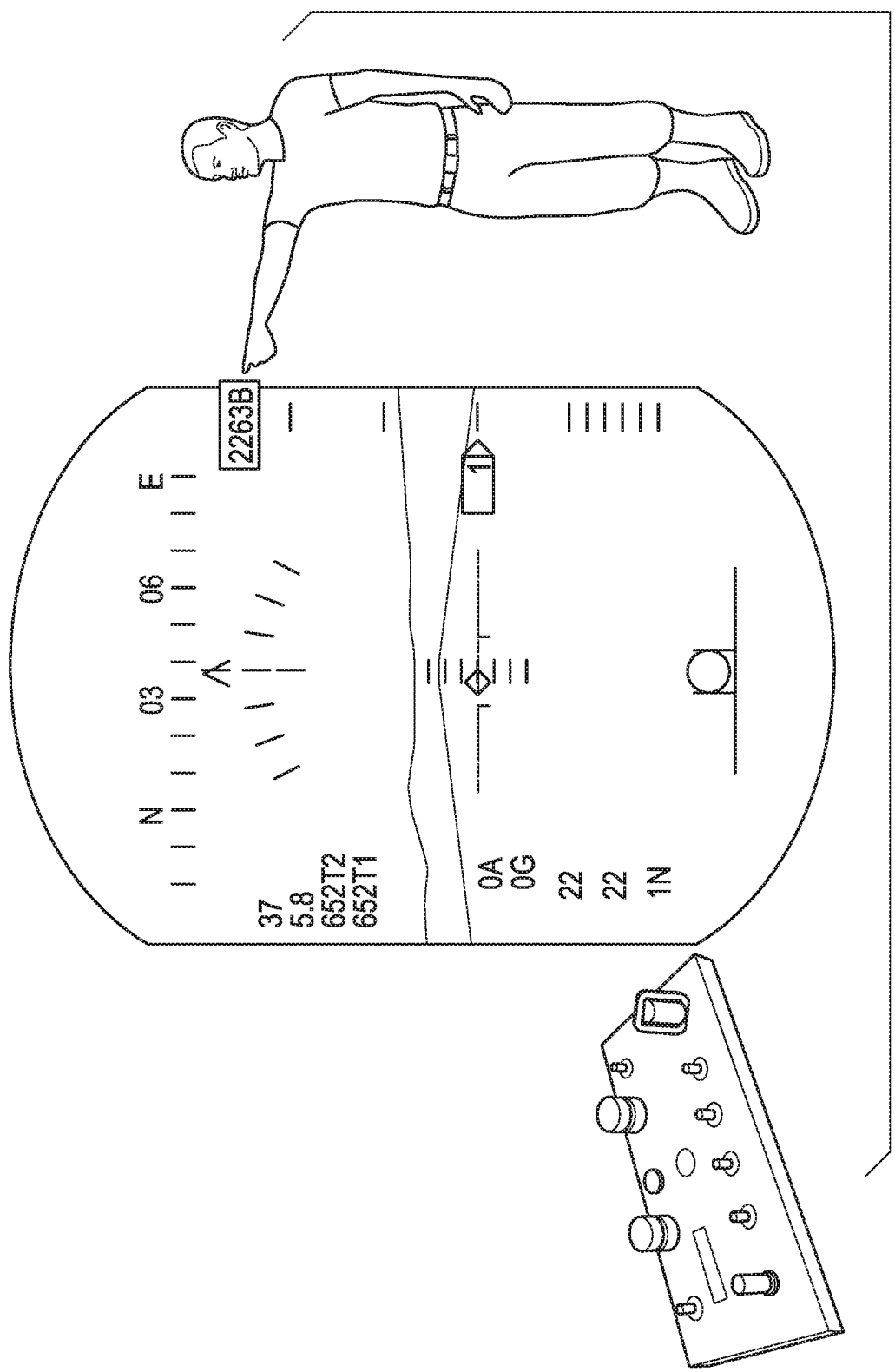
FIG. 6 is an exemplary display showing an avatar, and some training field of view and equipment presented to a trainee as an example.

For example, the IDME may be programmed with a rule that if the student KSA determined during a simulated aircraft training exercise indicates a poor understanding (either by a flag or a scale of effectiveness that is below a predetermined threshold) of an aspect of the operation of an instrument panel, e.g., an altimeter, then a special avatar is to be displayed and a an instructional statement made via the sound system of the immersive system 3. In case the current KSA data corresponds to such a flag or falls below the threshold, indicating a shortfall of the trainee's KSA, the instruction is transmitted to the learning content adaption 5 directing display of the avatar and playing of the audio. The required video and audio is located in the training content database 21, and the LCA 5 transmits it to the immersive station platform, where it is displayed or played to the trainee. FIG. 6 shows a main display screen view, wherein a human-appearing avatar is giving audio instruction regarding an aspect of flight training.

The avatar may be displayed as part of the rendered imagery shown to the trainee, e.g., as a person standing in the environment displayed and speaking to the trainee. Moreover, the rules-based system can make the avatar interactive with the trainee, responding to the trainee's reactions to the avatar's statements or commands.

For another example, the IDME may have a rule that if the eye tracker data indicates that the trainee has not blinked for thirty seconds, then the LCA is to schedule a break or discontinue the process and request assistance from the human trainer.

The then portion or action specified by the rules to a KSA deficiency relative to an acceptable KSA level may be as simple as repeating a previous course of instruction when a trainee shows a lack of proficiency in one particular area. On the other hand, the action may involve an immediate modification of the training presently being given to the trainee so as to enhance certain aspects of the training so as to offset a shortfall in training that is detected.

Another possible rule is one wherein the if portion of the rule is that the data indicates that the trainee is doing extremely well, has very high performance assessment and a low or zero KSA gap, possibly coupled with a biometric data having an indication of physiological effects of low stress or disinterest, such as blinking longer than usual, then additional complexity or difficulty is introduced into the ongoing training.

The internal software-based computer architecture of an embodiment of the system is illustrated in the diagram of FIG. 1. The host computer system generally indicated at 23 supports the operation of the training station 3, and preferably is connected via a network, e.g., the Internet, with the computer system that supports the LMS 5, allowing for the individual trainee to sign in, be recognized by the system, and to have his personal data, if on file, restored to the local system(s) of the training station 3 to assist in his training.

The host interface 25 also provides interface of the training station 3 to external simulation state data, and allows training station 3 interactions to be applied to an external simulation, i.e., a simulation program running on a connected computer system. For example, when a student turns on power to a virtual HUD by touching one of the touch screens of training station 3, this action generates an input signal that is communicated to the connected simulation. Responsive to the input, the simulation changes the switch position in the HUD, and the data defining the switch state in the simulation data base, and the power lamp changes color. The new state is communicated through host interface 25 to the virtual learning object (VLO), meaning the display in the training station 3, e.g., one of the touch displays, that is configured by the lesson data to look like a HUD control. The VLO changes the displayed appearance of the virtual device, e.g., the HUD, to match the host state data for the simulation of the device.

One or more processors in the training station administer the operation of the training platform, which is initiated with all programs and data needed for the selected course of instruction. The platform state data 33 is initialized and made available to the IDME 7, which accesses both the platform state data and the student state model data. The platform state 29 indicates the state of operation of the simulator attached to the system, and the student state model 35 reflects just data that has been stored based on the student's conduct and prior history as a trainee. Together these two groups of data are treated as "facts", the data to which the rules of the CLIPS inference engine 31 are applied.

The output of the IDME 7 (if any is indicated by the rules) is actions 39 that are transmitted to the LCA, the learning content adaptation service. These actions 39 are usually data that is transmitted to the learning content adaptation system 9, which in turn accesses the lesson database 41 accessible to the LinkPod™ core computer so that it can automatically obtain data stored therein. The LCA 9 transmits to the immersive platform service tasks that are to be executed by the simulator platform system, including avatar tasks, and other platform tasks for display or interaction with the trainee. This includes directing rendering of 3D imagery by an image generator computer system based on a database of virtual environment data, including models of vehicles and other objects, textures, and other aspects of display or presentation such as fonts and VOF. Data is returned from the simulation platform in a raw form, and that data is then processed to be converted into student state data or platform state data and stored in the relevant data areas for access by the IDME 7.

Figure 11:
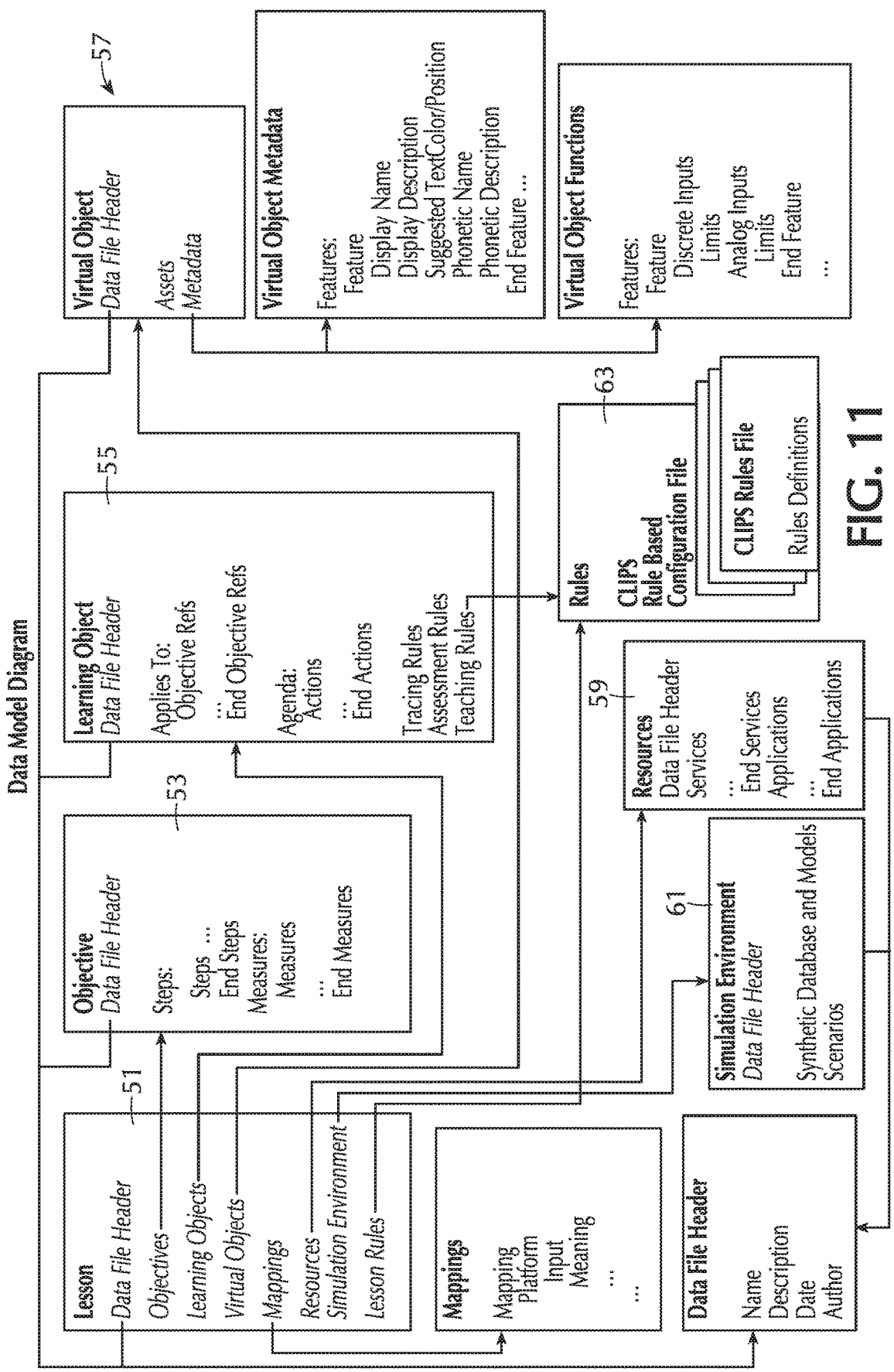
FIG. 11 is a diagram of a data model by which the data is stored in a computer accessible memory device.

FIG. 11 shows a diagram of the data model according to which data for the learning management system is preferably stored and utilized within the system of the invention. All of the elements and objects shown herein constitute data stored electronically on data storage devices that are accessible by a computer. The data model illustrates the organization of the stored data in the database, and is reflected in the database by stored database organizational data, e.g., pointers pointing to the location of data corresponding to records, which is used by software accessing the database to retrieve or store data therein on the data storage device or devices containing the database, as is well known in the art.

The LMS 5 identifies each course of instruction as a lesson record. The lesson record contains pointers or lists that include
 a set of objectives of the lesson,
 a set of learning objects of the lesson;
 a set of virtual objects of the lesson; a set of mappings for the lesson;
 a set of resources for the lesson;
 an identification of a simulation environment for the lesson; and
 the lesson rules to be loaded into the IDME for the lesson.

The objectives are each stored as a record 53 with a list of steps to be performed by the trainee in the process of the lesson. These are each a discrete action, such as "identify landing gear control", and they can be satisfied by a test question given to the trainee. In addition to the identification of the steps, there are a set of measurements of effectiveness of completion of the steps by the trainee, either a flag set to 1 (completed) or 0 (not completed), or a range of effectiveness of the step completion.

The learning objects are each stored as a record 55 that defines a series of actions to be taken, i.e., displays of imagery or avatars or administration of tests, generally all outputs to the trainee through the immersive system.

The virtual objects are records 57 that define virtual controls, such as cockpit controls that are displayed in interactive viewing displays 8 so as to appear similar to the controls of the real vehicle that is being simulated.

The resources are identified as a data record 59 that lists the hardware of the immersive station that is to be used in the lesson, e.g., whether the microphone and voice recognition is to be employed, whether the eye tracking system or other biometric system is to be employed, etc.

The simulation environment record 61 identifies a specific database of scene data defining a virtual world that is used for the given lesson. There may be a large number of virtual environments defined in the system, such as mountains, desert, oceans, each of which may be selected by a lesson for use as the training mission environment.

The rules record 63 contains the set of rules for the lesson 51, written in CLIPS language. These rules are loaded into the IDME when the lesson is started. Individual learning object records may also reference rules records 55 as well, which are loaded when the learning object is loaded, and deleted from the IDME when the learning object is completed.

Figure 7:
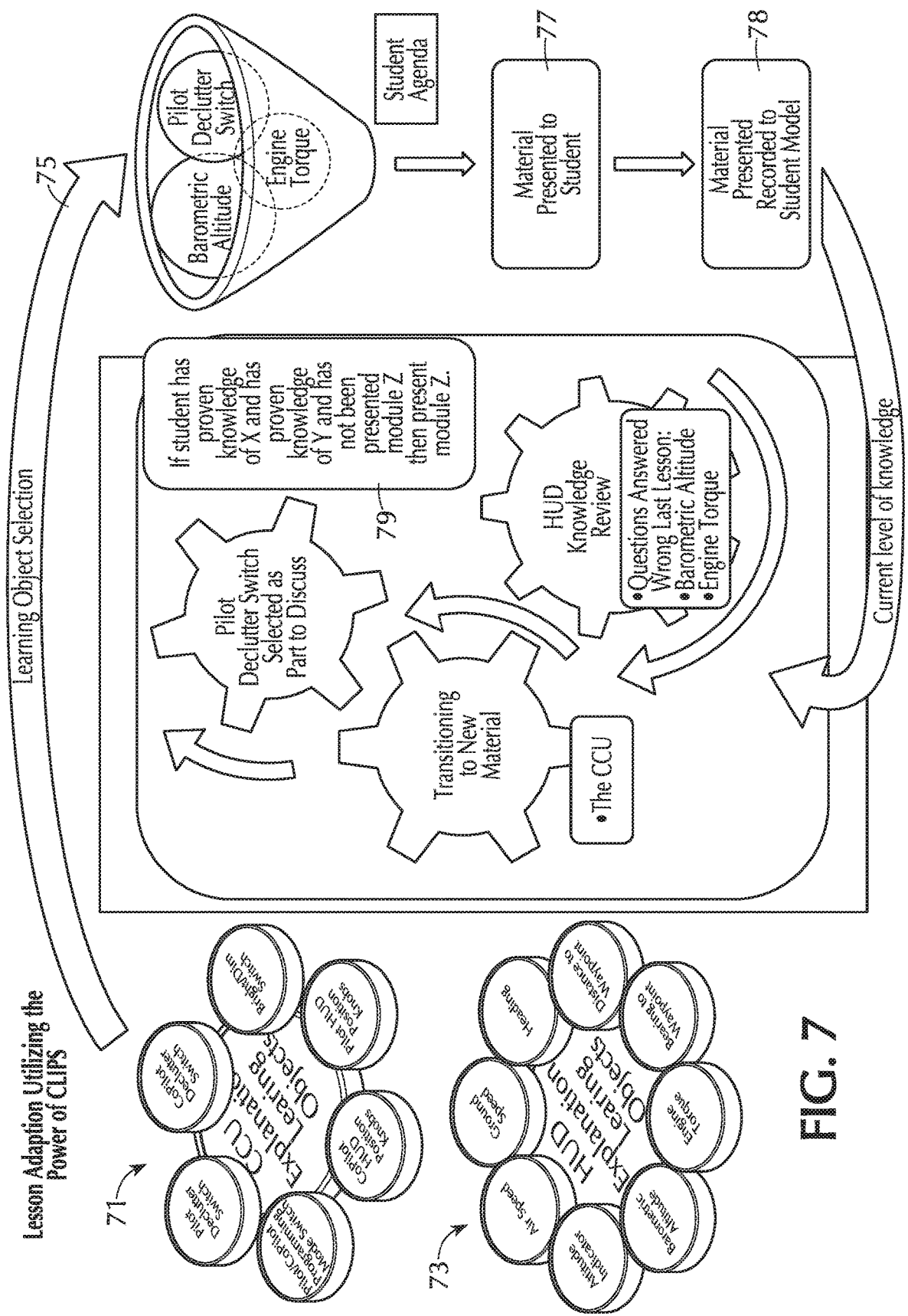
FIG. 7 is an illustrated diagram of the operation of a rules engine to administer a training program for the HUD (Head-Up Display) and CCU (Cockpit Control Unit) of a vehicle.

FIG. 7 illustrates a simple rule based process of training in which a lesson involving training in learning objects 71 having to do with operation of the CCU of an aircraft and learning objects having to do with HUD operation of the aircraft are combined.

Learning objects for the training are selected, step 75, based on student state data at startup, i.e., the level of training or skill of the student according to the LMS records. The general rules are loaded, and the set of learning objects are loaded. The rules control the presentation of the learning objects to the student so that a student will not be given a more advanced lesson until the student has completed the necessary prerequisites. The order of completing those prerequisites may vary from student to student, but the rule will not permit the display of the advanced learning object until the student state data indicates that the prerequisite learning objects have been completed.

As seen in FIG. 7, an agenda of learning objects is selected for the student, and the rules cause them to be presented to the student (step 77), and once the material has been presented to the student, the student state model data is updated to reflect the fact (step 78). Based on the initial run and an assessment of the student knowledge level, a rule 79 is applied to the extant student state data: "IF (1) student has proven knowledge of X, and (2) student has proven knowledge of Y, and (3) student has not yet been presented module Z (another learning object), THEN present module Z" as reflected by values stored in the student state data. This rule is active, but its IF-part is not satisfied until the student state data indicates that the student has knowledge of X and Y. When the student state data indicates that the student has knowledge of X and knowledge of Y, then at that point in time, the rule causes Z to be presented. Once presented, the student model or student state data is updated to reflect that Z has been presented, as by, e.g., setting data as a flag corresponding to completion of the Z module. After this, the student model or data indicates that Z has been presented, and the IF-part of the rule, which includes the determination "(3) student has not yet been presented module Z" is not satisfied, and the rule does not cause any action from then on.

Figure 8:
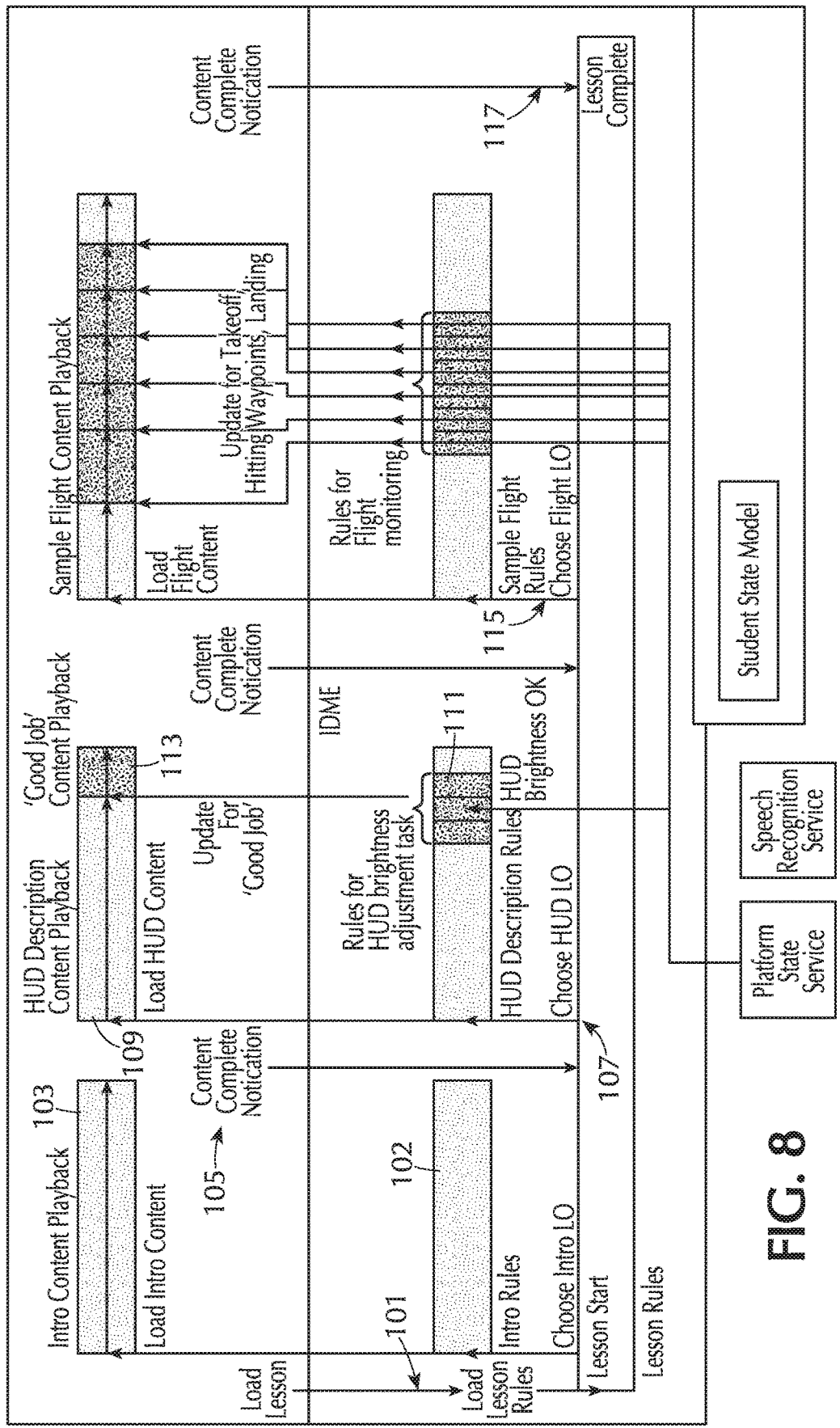
FIG. 8 shows a diagram of a timeline of training of an ideal student using the training system of the present invention.

FIG. 8 shows a timeline flow for a lesson as applied to a student that is an ideal student, meaning that the student completes the objectives of each learning object without creating conditions in the student state data that cause the IDME rules to trigger remedial actions.

At the beginning 101 of the timeline, the lesson is loaded, and this includes loading of the lesson rules. The lesson starts, and the first rule to activate is the Intro Rules 102, which trigger the action of Intro Content Playback 103. When the intro is completed, this rule is not satisfied by the data because a flag or content complete for the intro learning object ("LO") is set at 105. The HUD LO Description Rules 108 then are satisfied and become active, the action being to load the HUD content and play the HUD playback 109. When that is completed, the HUD rules direct an adjustment task for the student to perform at 111. This task is successfully completed and the HUD rules then direct playback of a "good job" message (113) to the student. When all of these actions are completed, flags so indicating are set in the student model data, and the HUD description rules are no longer satisfied and become inactive. At that point 115, sample flight LO rules become active, and the rules are satisfied and run through to successful completion at 117.

Figure 9:
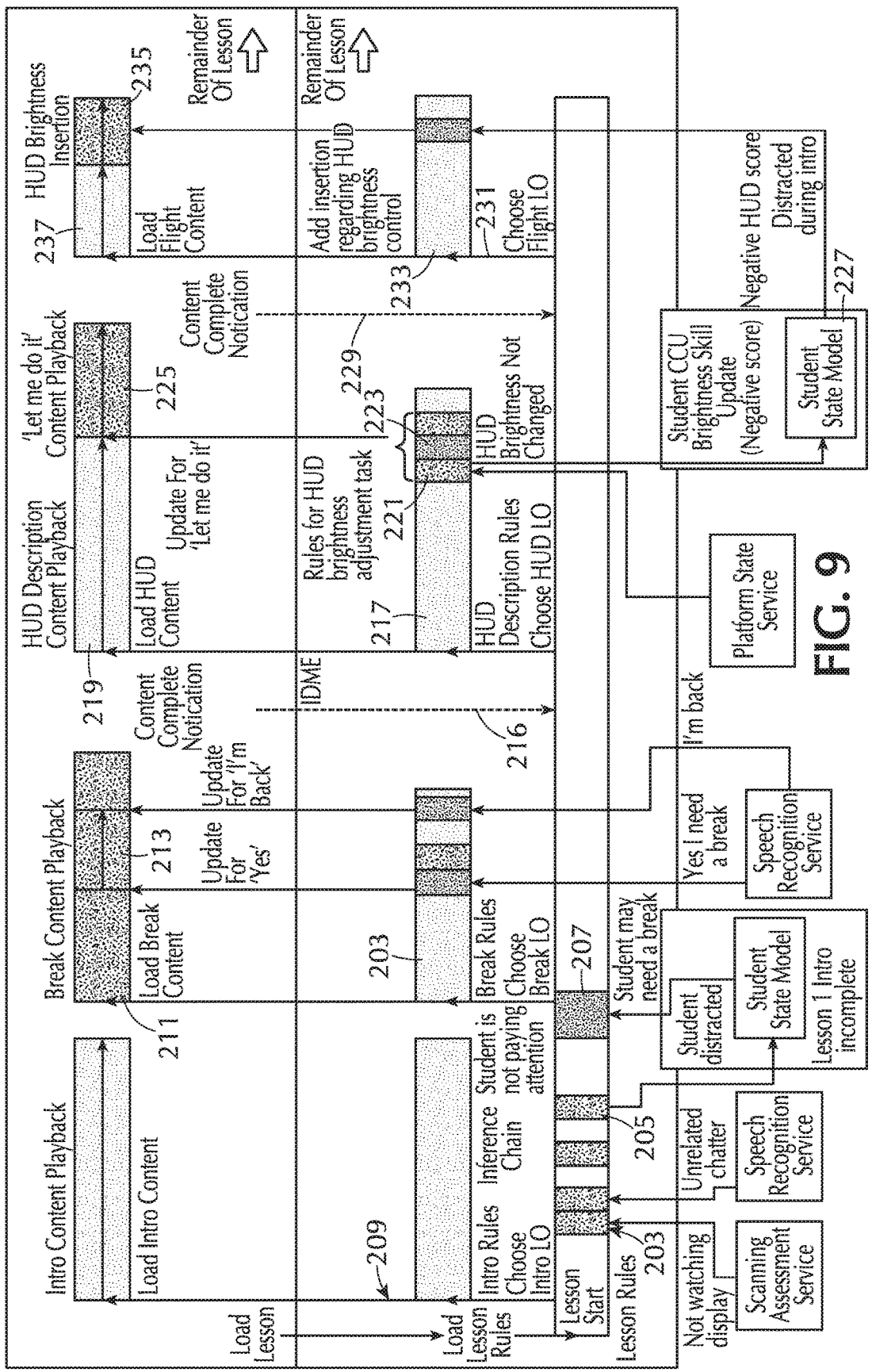
FIG. 9 is a timeline diagram of a student requiring corrective or remedial actions being trained in this same material as in FIG. 8.

FIG. 9 shows a different outcome based on the same rules, all of which are loaded at point 201. The rules include eye-tracker data based rules that react to data indicative of the student not watching display, and of microphone pickup of chatter indicative of distraction.

The Intro LO is loaded, and the intro content playback proceeds. In addition to the intro rule, the distraction detection rule is running as well. When the student data indicates that the student is not watching the display (203) and there is chatter from the microphone (205), the distraction rule triggers a break-offer action 207. The break is conducted according to Break Rules 209, which involve playback 211 offering a break, listening (213) for an acceptance, and then resuming on return of the student (215). The intro completion flag is then set at point 216.

The HUD LO then starts according to the HUD description rules 217. There is the HUD content playback 219, followed by a test of HUD brightness adjustment 221. The student here does not properly change the HUD brightness (223), and the rules cause playback of the system itself doing the brightness adjustment (225), A negative effectiveness data value is then stored in the student state data (227).

The HUD rules actions are completed at 229, and the HUD rules become inactive. The rules then load the Flight LO at point 231 with the Flight LO rules 233. The flight content is then run, but there is an active rule that has its if portion satisfied—IF (1) the student has a negative HUD score, and (2) if the student data indicates distraction during the intro playback, THEN an action is directed that a HUD brightness training event insertion (235) is made in the flight LO content 237. Once that is completed, the lesson continues as before.

The remedial action taken in this way using the rules engine avoids failure of the entire lesson effectiveness, because corrective action is taken during the lesson to correct for the distraction and knowledge deficiency detected in the student. The result is more efficient use of the simulation system.

Figure 12:
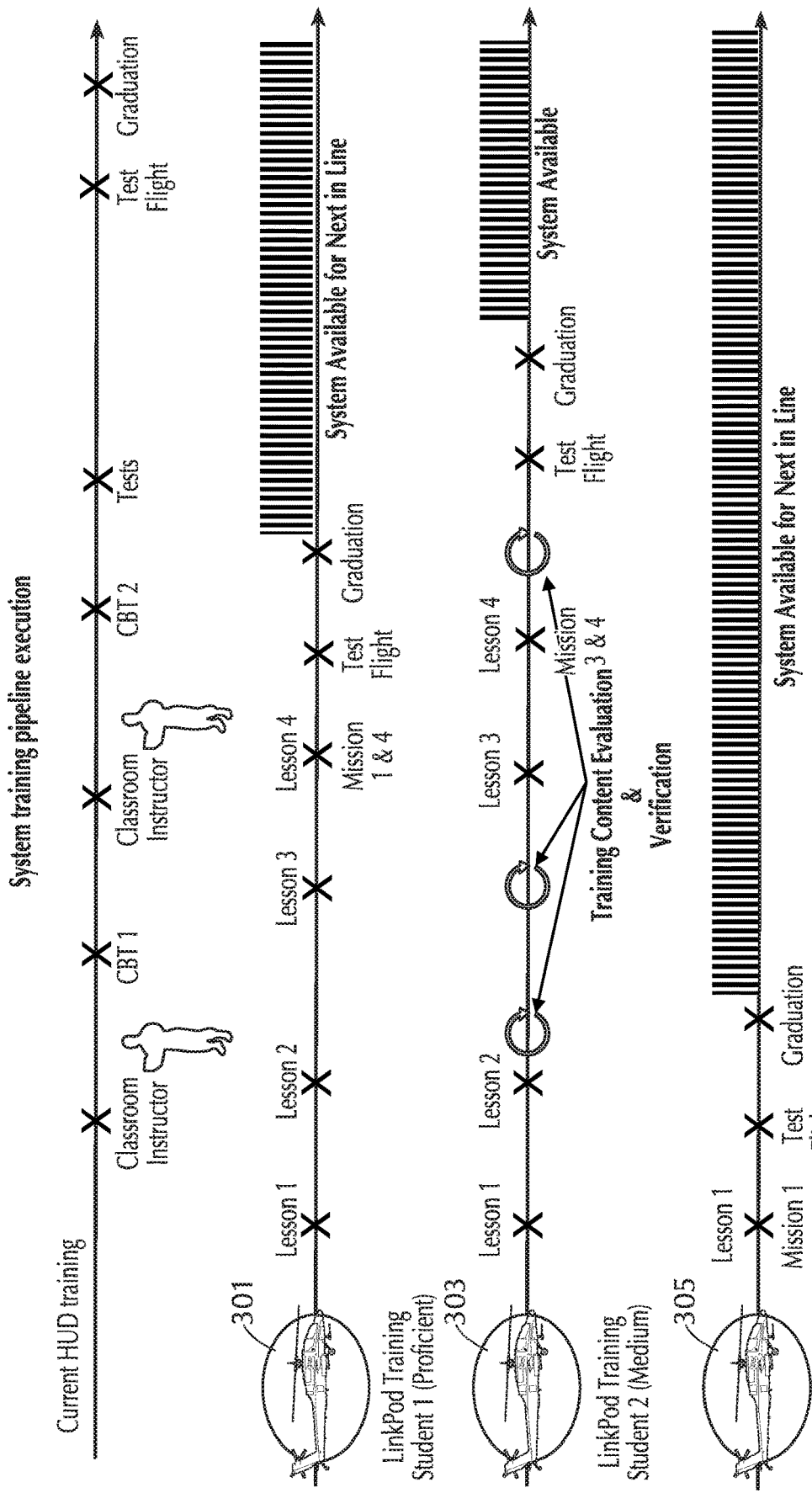
FIG. 12 is a diagram illustrating the relative efficiencies of training for a number of different students at different skill levels.

Efficiency of the rules-based approach is also illustrated in the comparative timelines of FIG. 12. A proficient student timeline is seen at 301. The proficient student completes four lessons, and his proficiency is detected by rules-based assessment. He then completes two missions 1 and 4 appropriate to his KSA level, completes a test flight and then graduates, freeing the system for the next trainee.

The timeline 303 for student 2, of medium ability shows the same four lessons, with additional training content inserted throughout, resulting in a test fight and graduation in slightly longer time than required for the proficient student, but not equivalent to repetition of the course.

The timeline 305 for an expert student is greatly accelerated, because the training is intensified as the rules detect a high level of KSA, resulting in a mission and a test flight after only one lesson, and immediate graduation. This frees the system for an appreciable amount of time, and does not waste the trainee's time in unnecessary training either.

Figure 13:
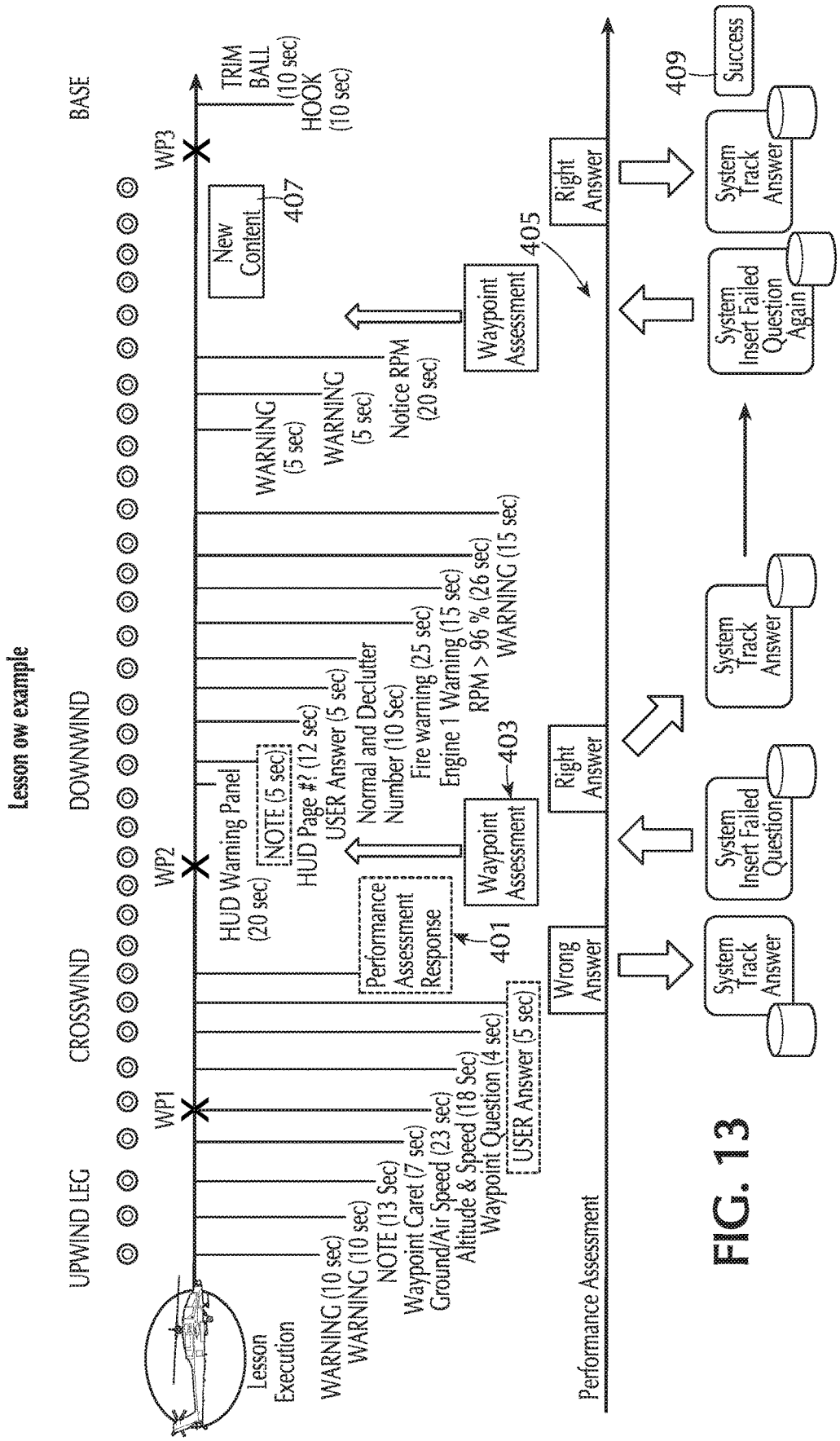
FIG. 13 is a diagram of an example showing lesson flow for an exemplary rules implementation.

FIG. 13 also illustrates flow of a lesson. The trainee in this scenario gives the wrong answer at assessment point 401. The student data is modified to have a flag indicative of the wrong answer. The question is re-asked at point 403, and the right answer is given. A running rule tests this question again at point 405, and when the wrong answer is given, new content 407 is inserted and displayed to the trainee. The right answer is then given at 409.

Figure 14:
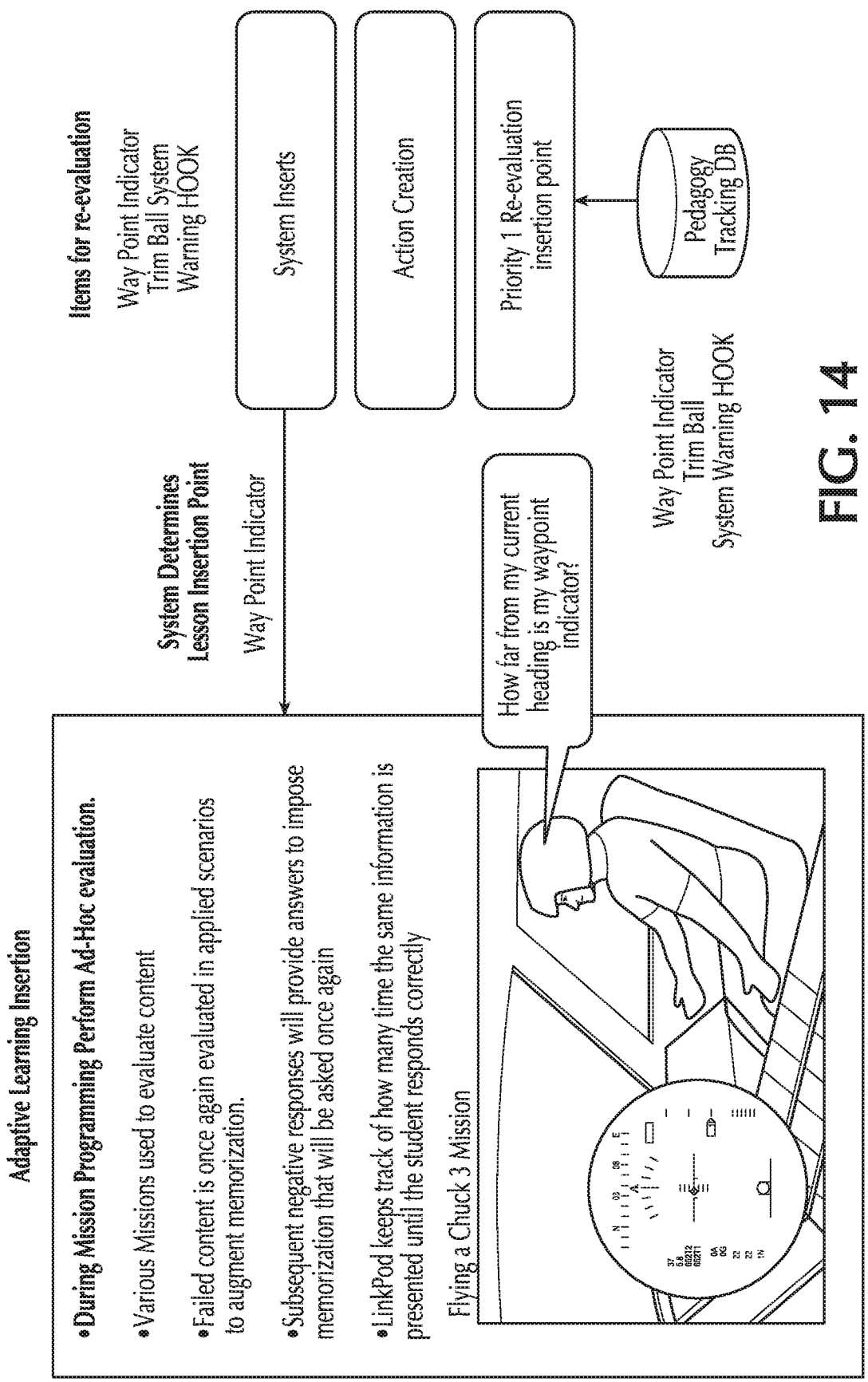
FIG. 14 is a diagram illustrating trainee insertion in the adaptive learning system of the present invention.
Figure 15:
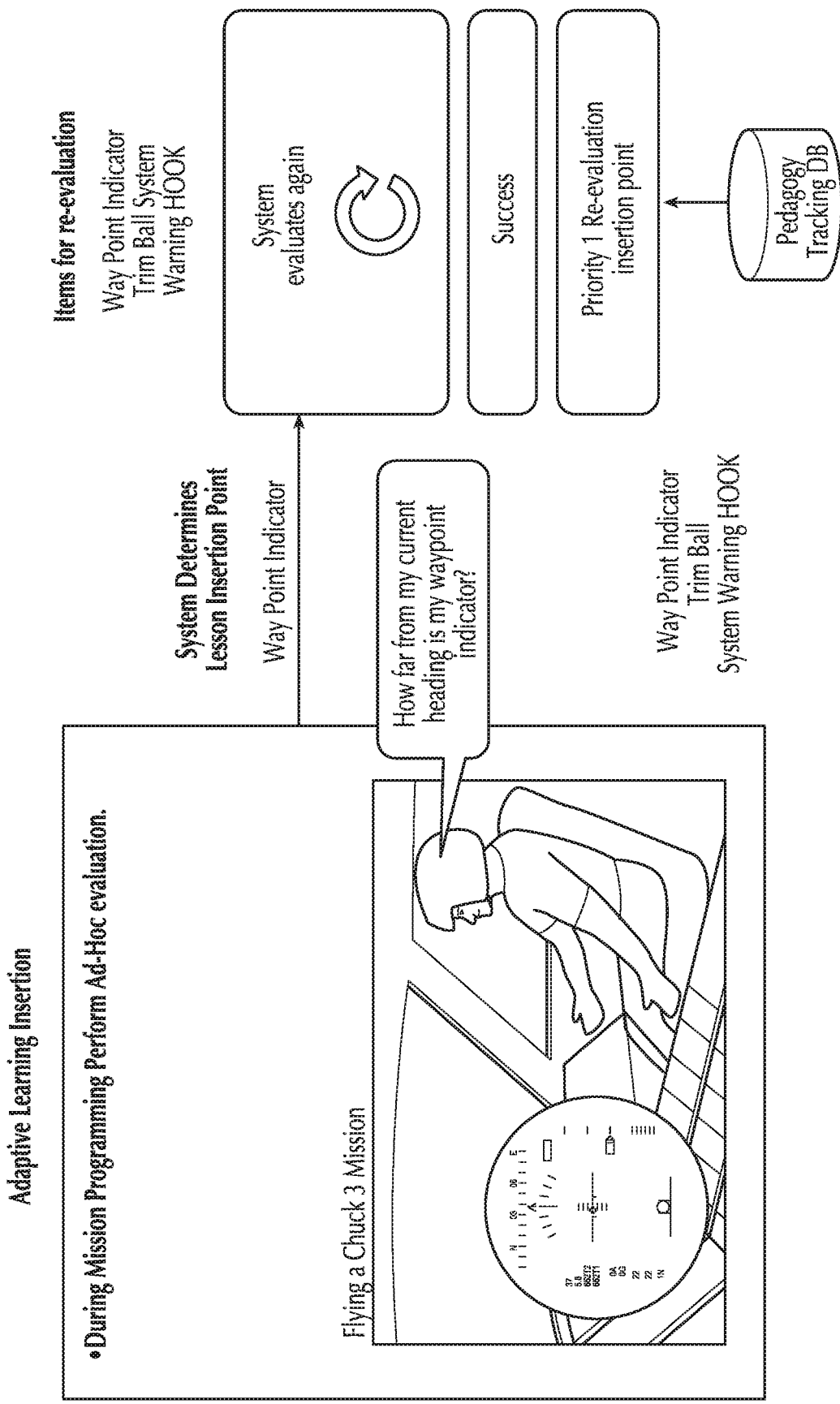
FIG. 15 is a diagram illustrating trainee re-evaluation in the adaptive learning system of the present invention.

This adaptive learning approach is described in FIGS. 14 and 15. The adaptive learning allows for both insertion and reevaluation. As listed in FIG. 14, various missions are run to evaluate the grasp of the content by the student. Failed content is inserted into the missions to augment memorization of the content by the student. Where questions are used to determine the retention of the information, the questions will be repeated to enhance memorization. The system preserves in the student state data the number of times the information has been presented to the student before the student answers the question correctly.

As described in FIG. 15, the failure to answer a question correctly can trigger a rule that an ad hoc evaluation of the content may be presented during a mission.

The rules engine architecture allows for this type of flexible training method. To obtain maximum efficiency, the rules must be developed and written in a way that identifies KSA parameters that are to be satisfied, and breaks the lessons up into workably discrete components that can be addressed independently to determine when the student has developed the requisite level of training KSA, and when he has not, to take remedial action immediately so as not to allow a partial deficiency to delay the entire training process.

Figure 10:
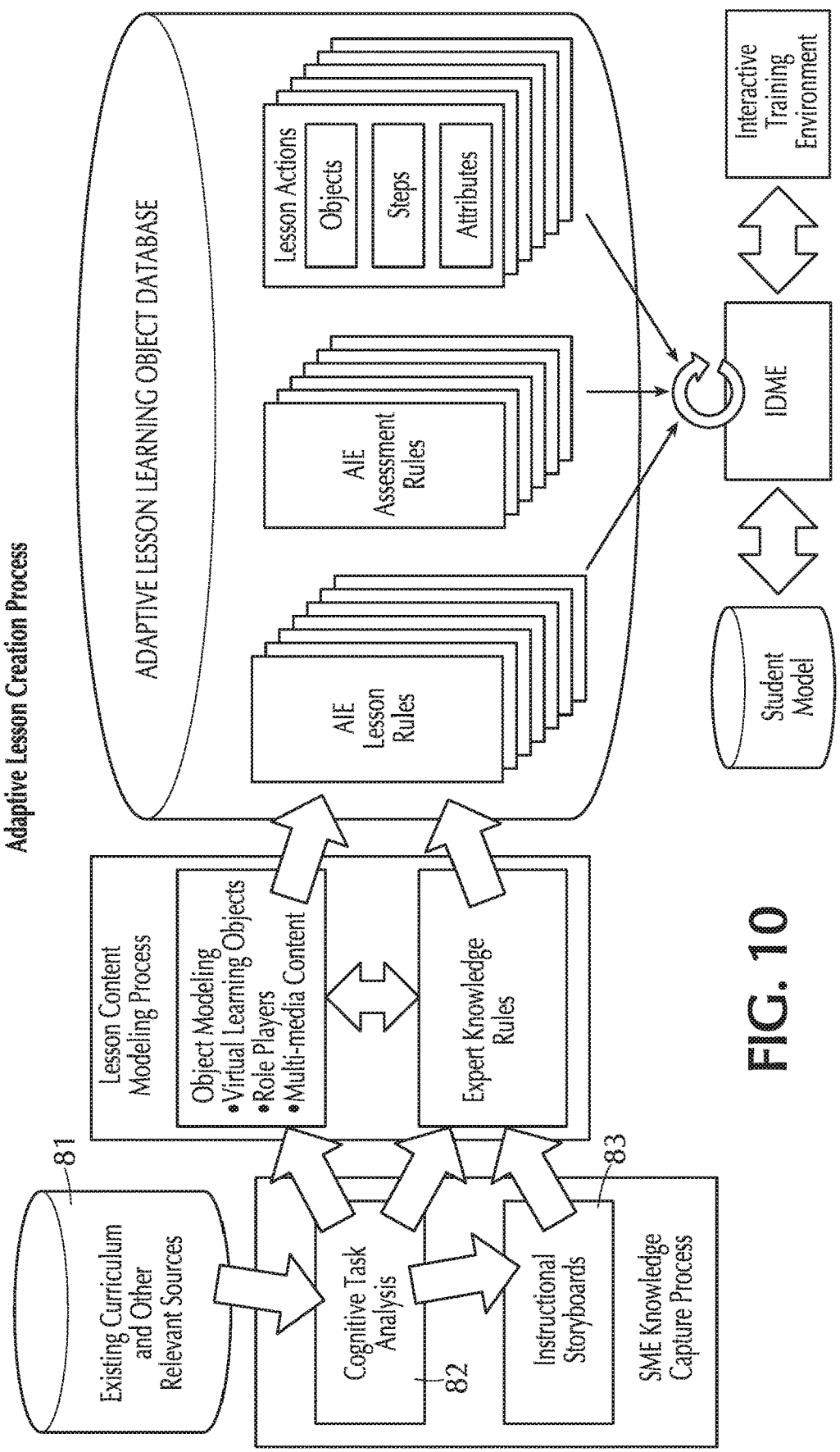
FIG. 10 is an illustration of the development of the learning object database used for the present training method.

FIG. 10 illustrates the process of creation of the rules for a lesson. An existing linear curriculum 81 is broken down by cognitive analysis (step 82) into instructional storyboards (83). The cognitive task analysis 82 and the instructional storyboards 83 are used to develop the expert knowledge rules, and also object modeling for the development of the learning object database for presenting the lesson to a trainee in a rules-based system. The rules of the learning object include lesson rules, which govern the content presented and its order of presentation. Assessment rules identify specific ways of determining KSA of the student, as well as other aspects of the student's state, such as distraction or boredom. The resulting rules are loaded into the IDME when the training is conducted.

Figure 16:
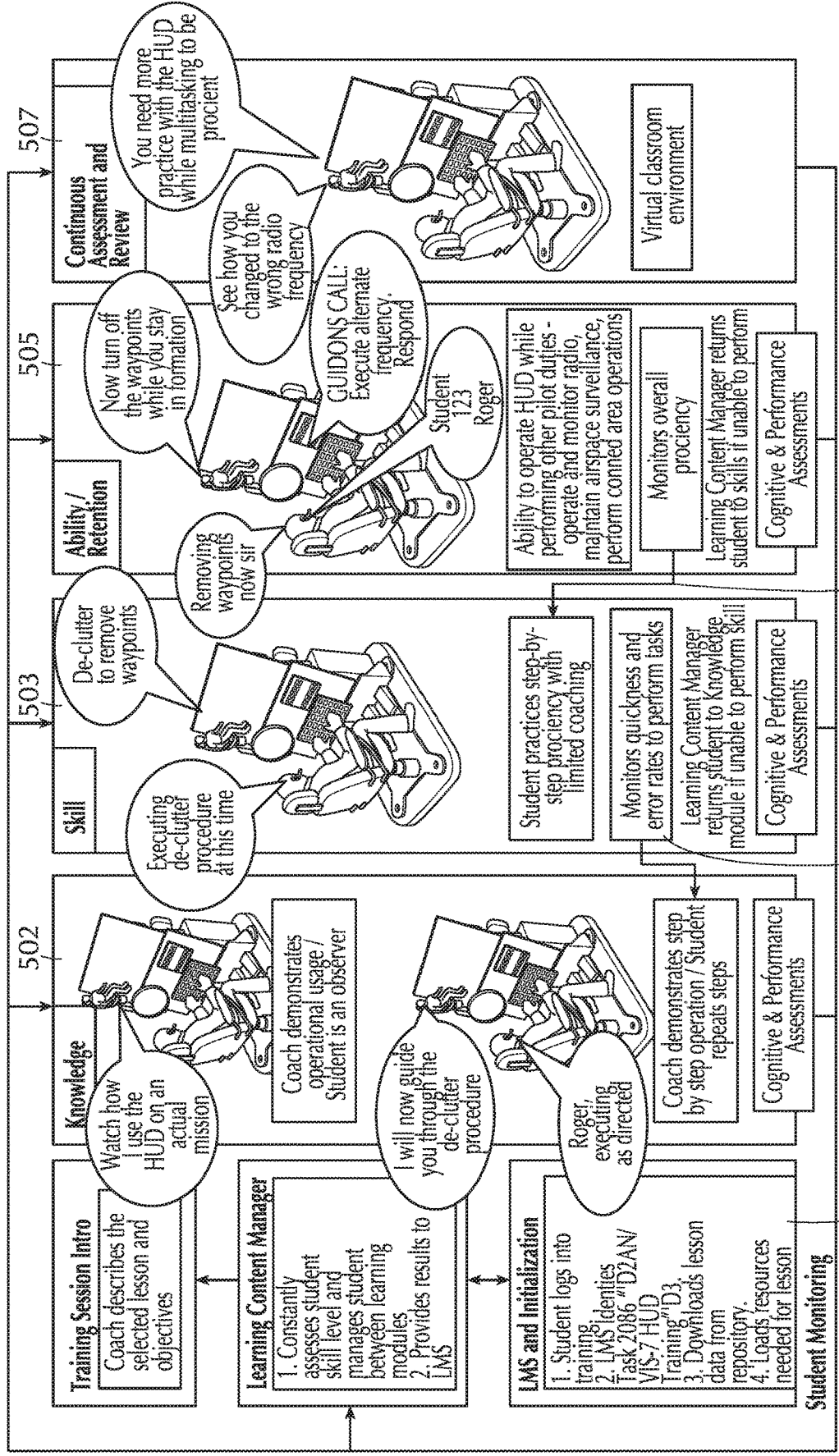
FIG. 16 shows a story board style illustration of the training process for a UH60 attack helicopter simulation, illustrating various rules-implemented processes possible according to the present invention.

A KSA storyboard example is shown in FIG. 16. The trainee logs in and starts the training via the LMS (step 501). The learning content manager (which includes the IDME, not shown) constantly assesses the student skill levels. The student is first given the knowledge of the lesson, in this case a HUD training exercise, by a virtual coach that performs the HUD usage and then directs the trainee through a declutter operation (stage 502). Once completed, skill is developed by reducing coaching in stage 503. If too slow or too prone to errors, the trainee is sent back to stage 501 for more knowledge training (step 504). If not, the trainee moves to stage 505 for ability and retention training. In this stage 505, a more complex mission using the knowledge and skill is presented to the trainee. If the trainee is not able to perform, the trainee is returned to stage 503 for further skill development. If the trainee is able to perform, further training on points of detected weakness can be given in stage 507.

The operation of the training method of FIG. 16 is based on rules that are continuously active. In particular, a rule is constantly in effect that is the determined level of skill falls below a predetermined threshold, the training action is then changed to a knowledge-type coach training as in stage 502. Similarly, a rule responsive to an assessment of ability falling below a predetermined threshold causes the training action of changing to a skill level training. The changes of training to different stages are immediate due to the constant applicability of the rules via the IDME. The result is efficient development of knowledge, skill and ability for the trainee.

Figure 17:
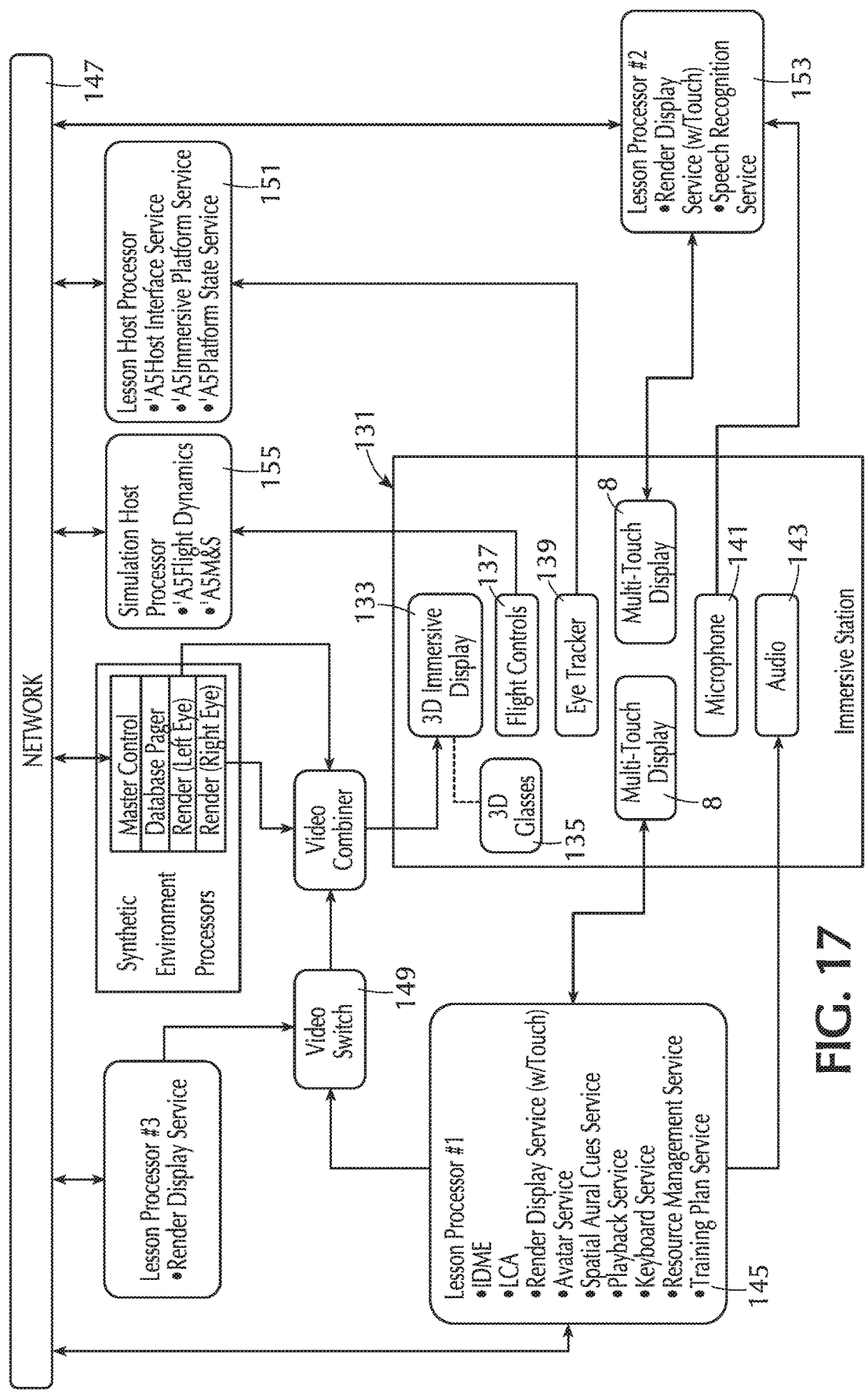
FIG. 17 is a diagram illustrating the structure of a multi-processor embodiment of the invention.

FIG. 17 illustrates the architecture of a preferred embodiment of a multiprocessor system supporting a LinkPod immersive training station 3. The station 3 includes the set 131 of I/O devices that interact with the trainee. These include a 3D immersive main display 133; cf. display 6 of FIG. 5, with associated 3D glasses 135 to be worn by the trainee. The I/O devices include also flight controls 137, which may be a joystick or a more elaborate cockpit control system that can emulate real vehicle controls, and left and right touch screens 8 that allow trainee input to the system and display appropriate media or VLOs to the trainee. The I/O devices may also include biometric sensors such as an eye tracker 139 of the sort well known in the art of simulation and military aircraft, a microphone 141 that receives audio input from the trainee, and an audio system 143 that generates sound as required by the training process.

A computer lesson processor #1 (145) with access to a local data storage device and also access to a network 147, is connected directly with and transmits data and/or media to one touch display 8 and the audio system 143. It is also connected with video switch 149, which switches between video supplied from two possible sources, as will be described below. Lesson processor #1 supports execution of the software that supports the IDME and the LCA functions of the station 3. It also administers a number of services, i.e., the touch screen service, a service that displays an avatar instructor for the trainee to view, spatial audio service that can output specific sounds via audio system 143 as part of the training, playback of video or audio when appropriate, support for a keyboard of the system, and resource management and training plan services that operate as described above with respect to the IDME/LCA operation, obtaining, locally or via network 147 from the LMS, and implementing the various media or data needed for the training selected.

The operation of lesson processor #1 is initiated by lesson host processor 151, which is connected therewith by the network. Lesson host processor 151 supports the eye tracker 139, but also administers the immersive platform and maintains the data of the platform state, which is accessible to the IDME of lesson processor #1 locally or via the network. This host processor 151 assists the trainee in initially logging in and accesses over the network 147 the LCS system, identifying the trainee and selecting the lessons that are to be implemented. The rules, media, and other data needed for the identified training are then transmitted from the LCS system over network 147 and loaded into a data storage device accessible by lesson processor #1.

Lesson processor #1 communicates via network 147 with lesson processor #2 (153), which receives from processor #1 data directing what it should display on the associated touch display 8. Lesson processor #2 also receives data from speech recognition of input via microphone 141, which is incorporated into the platform state data accessible to the IDME.

An additional processor, simulation host processor 155 provides for vehicle simulation, i.e., it determines using a computer model and scene data as well as data of the platform state or student state how the vehicle is moving or operating. Data including the trainee ownship location in a virtual environment and other simulation data is output over the network to synthetic environment processors 157.

The synthetic environment processors 157 are essentially a multiprocessor image generator that renders an out-the-window view to be displayed to the trainee. This view includes distinct 3D imagery for the left and right eyes of the trainee, which is sent through a video combiner 159 and displayed in 3D to the trainee on immersive display 133.

Lesson processor 1 accesses video switch 149 and selectively displays either the OTW imagery being rendered in real time by processors 157, or it transmits recorded video that is transmitted from lesson processor #3 (161). Lesson processor #3 outputs recorded video the training session does not provide for trainee changes in the video portion displayed of, e.g., a flight taking place where the trainee is a passenger or supportive technician in the simulation, working on different aspects of the vehicle operation. Time-stamped recorded video or live video may also be supplied and displayed in this way as well via lesson processor #3.

The network 147 links all the processors so that the IDME can implement its actions through those processors, and the entire environment acts as a stand-alone training module. Additional training materials and data may be accessed at the LMS system via the network at all times.

In addition, the IDME shown is supported on lesson processor 1. It has access to virtually all the data of the training station 3, including the data stored at the other processors, and rules implemented by the IDME may be based on the state of any of this data. Also, because the rules are in continuous effect, the IDME engine may be divided into distinct sets of rules each supported on a respective processor acting as a decision engine that has access to the platform and student data.

The training station may also be readily adapted to the training of two or more trainees at once. The rules of the IDME simply need to be configured to support this functionality. Separate assessments of KSA for each student based on the different inputs from e.g., different touch screens can also be made and rules-based actions taken in response to those KSA values.

In a distributed network of substantial size, additional arrangements are preferably made to address the potential variety of computerized training stations that may be in the distributed networked system and other issues presented by the network.

Figure 18:
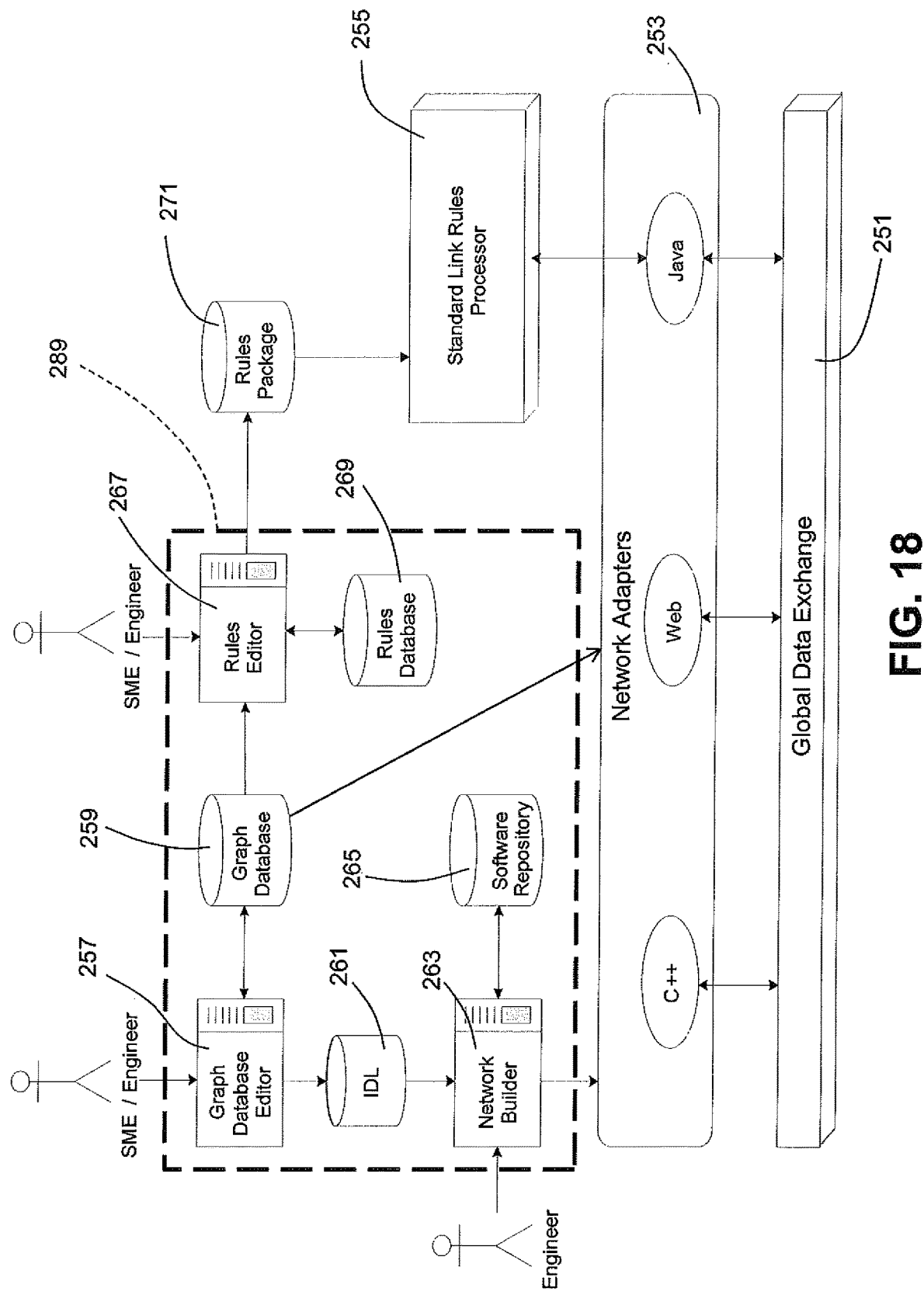
FIG. 18 is a diagram of a portion of an embodiment of networked system according to the invention with engineer tools for creating and editing the rules and the System of Record (SOR) system database.

FIG. 18 shows an aspect of a networked system with some of the interactive tools by which system designers or engineers may access a system of the particularly preferred embodiment. The network linking the computers of the system is shown as global data exchange 251. The system includes a small or large number of computers (not shown) each of which is connected with this network so as to be able communicate with the other computers on the network by sending data packets to them.

Communication over the network is controlled by a middleware system such as the DDS (Data Distribution Service) sold by PrismTech Corporation of Boston, Mass. as OpenSplice DDS middleware. The middleware system controls network traffic by a system of publishing and subscribing, where each computer transmits or publishes data on the network only to other computers that are subscribing to the data of the publishing computer. The middleware system usually includes a module of executable code on each computer that controls communications between the local computer and the network. Data being published is routed to a middleware hub memory from which it is transmitted directly to the subscribing computer systems on the network, where it is received by the module and transmitted to the associated computer. The result is that applications running on computers on the network all connect to the middleware instead of each other, and therefore do not need to know about each other.

Depending on the type of system or data transmitted, the data sent may be of a variety of formats. The outgoing data is initially converted at the publishing computer to a data format usable by the middleware, e.g., as data packets. Each data packet or "topic" includes a name field identifying the topic and one or more data fields appended to the name. The middleware receives the packets and transmits them to the middleware modules at the subscribing computer systems, or more specifically, the computer systems pull from the middleware data packets or topics with names to which they subscribe. The middleware is connected with the subscribing computer systems by network adapters that convert data from the middleware communication format to a format of the computer system, which may be, e.g., C++, Java, a web format (such as http) or some other format or organization of the data. As a consequence of use of the network adapters 253, the network communication is "agnostic" as to the type of simulators or computers connected with it. If a new system with different hardware or software architecture is provided, it may be incorporated into the network system by simply providing network adapters that convert the data packets into the new format, and convert the new format data into usable data packets.

Subscription of one computer system to published data of other computer systems preferably is limited to identified data packets, i.e., topics, with name data fields indicative of their relevance. For example, the publishing system may publish topics, i.e., data packet messages, which include name data tags identifying them as "startup", "shutdown" and "current speed". The subscribing system subscribes to only "startup" and "shutdown" data packets. The middleware will transmit "startup" and "shutdown" data packets to the subscribing system, but will not send any other published data packets, e.g., the "current speed" data packets.

To ensure that the networked system can operate, all computers subscribe to a certain minimal set of topics, specifically Instruction Operating System (IOS) command topics, which would include the command to start up and communicate. Apart from that, the system is of very flexible design, and subscriptions of each computer system on the network 251 are limited to data packet topics that are relevant to or necessary for its operation.

As shown in FIG. 18, the network adapters 253 also supply data and receive data from the rules engine system, here indicated as the Standard Link Rules Processor 255, in real time. Rules Processor 255 stores data as data objects on which the rules stored therein operate continually, reacting when the if-portion of any rule is satisfied. The function of the network adaptor in delivering the data packet to the Rules Processor system is a mapping function wherein an incoming topic or data packet is identified by the data in its name data field and any other identifying data, and the data field or fields of the topic are stored in the proper data area or areas in the memory of the Rules Processor 255 to be accessed by its rules engine.

Communication in the other direction is treated similarly. When a rule becomes active, any data transmission produced by the rules engine is converted by the network adapter from data in the rules engine memory data format to a data packet or topic that is transmitted through the middleware, i.e., data from a specific field in the rules processor memory being output over the network is mapped to a topic name that corresponds to the data area in the rules memory, which is placed in the name field of the data packet transmitted to the DDS middleware. The middleware then transmits the data package to any computer or computers on the network subscribing to data packages or topics having that name. When received by the middleware module at the subscribing computer(s) it is converted by the local network adapters into data of a format usable in the subscribing system.

This mapping provides for particularly flexible and efficient use of a rules engine in conjunction with a virtual network, and results in a system with the speed of real-time networking and the flexibility of systems that connect to databases.

Organization of the network and its components is accomplished by human engineers that access the system through user interfaces, i.e., computer stations with input and output devices that allow design and organization of the databases of the system. This is normally done independently of the real-time operation of the training system.

A central component of the training system is a graph database that stores effectively all data for the system, except for the actual learning objects. Graph database editor portal system 257 gives a systems engineer access to create, enter data for, and modify the graph database stored on computer accessible memory 259 that serves as the system of record, with the data stored thereon being organized as a Not Only SQL (NoSQL) graph database, allowing for easy modification and addition of additional entries. The graph database contains data defining all the necessary components of the system.

The graph database is configured using a Neo4J system, and its infrastructure integrates with the Neo4J graph database engine with a NeoL3 interface. The NeoL3 interface implements a computer-accessible stored data structure according to a model-based infrastructure that identifies the systems at their respective nodes on the network by node types, node properties, node labels and the relationships between the nodes. The defined internal constructs in the graph database are of known structure, which allows tools to be built for the structure and then reused.

The graph database contains data referred to here as metadata, which includes
  a. data defining all topics, i.e., data packets, transmitted over the network,
  b. data defining learning objectives for assessing performance for all earning objects of the various training courses available on the system,
  c. data defining all interaction between the trainees and the computer systems connected via the global data exchange network 251,
  d. any and all data relating to all aspects of the training, students, operation, or status of the networked system, except for learning objects, described above, which are usually extremely large files of video, images or other large amounts of data, and
  e. data defining references or pointing to the locations of all the learning objects available for use in the system.

The graph database contains authoritative data for the entire system and is stored so that its contents can be sent to any and all systems on the network. The graph database of the invention supports REST API, Web Services and .NET Framework assemblies to promote universal access from all run-time and development systems.

The common graph database of the prior art is formed of nodes connected by relationships or edges, without any constraints on the structure, and with unrestricted properties or labels, as those terms are understood in the art. In contrast, according to the preferred embodiment, the graph database is created using only predetermined specified models or templates for the nodes and the relationships, and their properties and labels. The templates are limiting, and they do not allow complete freedom of the designer to create any structures whatsoever. The result is that the graph database has a structural organization that can be used to identify data very quickly, taking full advantage of the speed of access of a graph database.

According to the preferred embodiment, the graph database editor stores a set of model or template data structures that can be used to create a node or a relationship in the graph database. The templates available are:

ModelNodes: data defining the nodes of the graph database, i.e., what ModelProperties, ModelRelationships and ModelLabels they are restricted to having.

ModelRelationships: data defining the limited ways in which ModelNodes can be connected to each other.

ModelProperties: data defining the permissible properties for nodes, e.g., the property name, size and content of the various data fields of the node, data type, etc.

ModelLabels: data defining the labels that can be given to nodes.

For example, a ModelNode might exist for a data record for a Trainee. The ModelNode "Trainee" would define the properties of the node as the ModelProperties Name and Date-of-birth, one being a character string and the other a numerical date of birth. The permissible relationships could be identified as the ModelRelationships Student-Teacher or Classmates. The permissible label would be defined as a ModelLabel Location, a character string identifying, e.g., a place of training selectable from limited options. The graph database incorporating this node would link a trainee only to the trainee's classmates and teacher. The node data would contain only the name and date of birth of the trainee. A label on the node might contain the place of training. No Trainee node could have a relationship inconsistent with the trainee status, such as Instructor-Employer, or a relationship appropriate only for a machine, e.g., Fuel_Needed, or To_Be_Inspected_By. Similarly, a node defining an inanimate equipment resource could not have a relationship of Classmate to any other node.

This is an extremely simple example. In reality, nodes may contain hundreds of data records and have many different types of relationships, properties or labels. However, the data structures formed by the templates restrict the otherwise free-form organization of the graph database, which provides a significant benefit. Due to its graph-data-model organization, the graph database can be easily modified or expanded to add more simulator or other systems, but it can also be searched easily using the structures selected to create the node. For instance, referring to the Trainee ModelNode above, a search of all trainees that were classmates could be run very efficiently by identifying all relationships based on the ModelRelationship "Classmate".

Because it is the system of record and in one location only, data changes or other updates to the system can be performed only once in the graph database, and then the changes will be transmitted via the network adapters to all systems in a single update transaction, as opposed to an operator updating each computer independently to coordinate changes through all of the systems. If the changes to the graph database involve the network configuration, they will also result in the IDL producing a modification in the network adapters, if necessary.

Using the data model of the configuration of the network of the graph database 259, and an IDL (Interface Definition Language) software tool 261 running on a Network Builder portal computer system 263, an engineer can construct or modify the communications of the network 251, adding new systems and also configuring the network adapter layer as needed to seamlessly communicate with the various systems, including the network adapter that connects the Rules Processor 255 connect to the network by mapping topics to data objects of the rules engine and the reverse. The IDL 261 can usually auto-generate a network adapter for new systems that are added, but user input may be provided to structure the network adapter functionality. All adapters that have ever been used are stored in a software repository 165. Only those adapters relevant to the current system configuration are stored in the network adapters layer 253.

Rules are developed, written, edited, added or deleted via the Rules Editor user interface computer 267, which accesses the graph database 259 and computer accessible data storage storing the current rules database and available rules 269. The rules that are so edited or created incorporate data from the current graph database, and ordinarily not at run-time of the system. The rules editor then stores a current rules package 271 incorporating the most current data from the graph database of all system data to a computer accessible storage area 271. The completed rule set is stored as a rules package for runtime execution in data storage 271, and the rule package is then loaded into the memory of the rules processor 255, after which the rules engine of the rules processor uses the rules to process the system data also stored in computer accessible memory at the Rules Processor 255. Rules packages are normally loaded at system start-up, or to provide updates if the graph database is amended or the rules are modified.

In the embodiment shown, Rules Processor 255 utilizes the Drools Expert rules engine and software from JBoss, a subsidiary of Red Hat. The memory accessed by the rules engine is locally situated, i.e., not at a different network location, and is populated with data received from the network adapter. The rules loaded in the Rule Processor memory create, retract and update facts, i.e., data fields, in the working memory of the rules engine, and also communicate by transmitting data to all systems on the network.

Because the rules have access to system-wide data, it is possible to "blend" training activities using more than one resource. For instance, in maintenance training, a student may interact with an Interactive Electronic Technical Manual for the apparatus concerned while also engaging in a simulation, with both of the interactions being administered and monitored simultaneously by the Rules Processor, which is publishing data causing the manual to be displayed and also to cause the simulation to proceed in parallel.

Another example of blending would have the rules-engine subscribing to past performance data stored on another system (e.g., a Learning Management System) for a student receiving truck driving training. Where a trainee has performed a training component in the past, e.g., a pre-drive inspection of a truck, and performance data indicates a failure of the trainee to detect a problem with a tire. This omission is recorded in the data stored at a Learning Management System on the network and made available to the rules engine, such that the student is able to experience the consequences of their oversight in the pre-trip-inspection as a vehicle fault in a simulation. For example, in a later training session, while driving a simulation of the truck, the rules engine would cause the tire with the problem to have a blow-out—a consequent development that is based on rules having an if-portion based on the data object of the performance data from the earlier course that was stored on another system (the LMS) on the network.

Similarly, the rules engine can enroll or waive additional lessons for a student based on the student's performance in a current lesson. The mechanism for this is that an instructor creates rules to publish enrollment recommendations to the network. Subscribers to these recommendations may include an instructor interface (so an instructor can review the recommendation) and/or an LMS, which will modify the student's planned course of training.

b) A rules engine may subscribe to past-performance information for a student published from an LMS or other learning records store. For example, a student may do a pre-trip-inspection of a unsafe vehicle ahead of operating it in a simulation and miss a problem.

c) Rules can be created to adapt/blend training in a single lesson based on the student's performance in that lesson. A student who makes a serious error in a simulator may, for example, receive a video presentation to show what the consequences of their error might have been and what they could have done different. Similarly, the difficulty of a training exercise may be reduced for a student who is struggling or increased for a proficient student.

A variety of other blending applications will be apparent to those of skill in the art.

Figure 19:
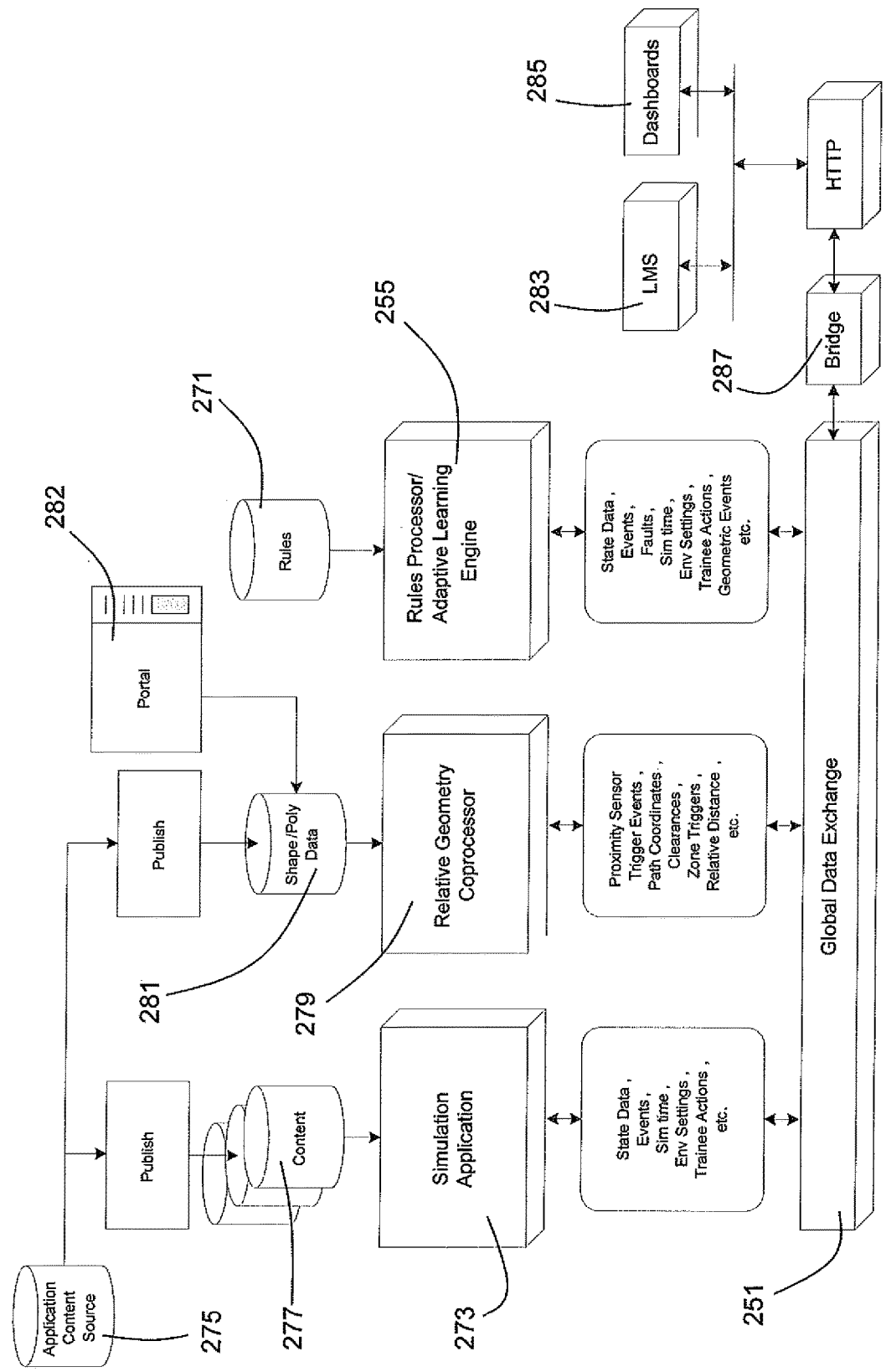
FIG. 19 is a diagram showing another portion of the networked system of FIG. 18 with a simulator and a relative geometry coprocessor on the network.

Another advantageous aspect of the invention is shown in FIG. 19, where the DDS global data exchange network 251 is connected with Rules Processor 255 as has been described previously through network adapters (not shown), which has been loaded with rules 271 as discussed above as well.

Another system on the network 251 is a simulator computer system 273, running a three dimensional simulation application, as is well known in the art. The virtual world in which the trainee is operating is defined by application content data 275 that is stored remotely at published over the network to the simulator, where it is stored locally at simulator 273 as computer accessible scene data content 277 and used to formulate a virtual environment in which the trainee moves around or operates a vehicle, etc.

Accessing detailed high-quality data about the simulation remotely is desirable for use by the rules engine in its capacity as an Adaptive Learning Engine, based on the rules, but this presents a problem in the prior art. In legacy simulators, the data may not be accessible as it is buried in the system or incomprehensible as being in a proprietary format. However, the system herein allows for monitoring of the position of the trainee or trainee ownship, and for making a detailed assessment of a scripted element, such as a simulated proximity sensor in the virtual environment.

Referring to FIG. 19 again, the simulation application publishes some of the data of the simulation, including state data (location of the ownship), events, simulated time, environmental settings (e.g., weather, fog, etc.), and some trainee actions. Another computer system on the network 251, the Relative Geometry Processor 279, also receives and stores the published application content data that defines the virtual environment, at least in part, in local storage 281, and subscribes to and receives the state data and other data published by the simulator 273. From the data received and the definition of the virtual environment, the RGP 279 determines the location of the trainee ownship in the simulation virtual environment, and the ownship's proximity to sensors in the virtual environment. The RGP 279 then determines e.g., when the proximity of the ownship to a sensor is below a predetermined permissible distance, the path of the student through the simulated environment and make assessment of the trainee's adherence to a predetermined ideal route, and also applying environmental rules such as limits on encroachment and collision avoidance. The results of the RGP 279 determinations, e.g., proximity sensor data, trigger events, path coordinates and clearances, zone triggers, relative distances, etc., are published over the network and subscribed to by the Rules Processor 255, which receives all data from the simulator 273 and the RGC 279. The data is placed in the rules engine memory, and the rules-based Adaptive Learning Engine for monitoring, assessment and adaptivity, e.g., by reacting as appropriate to address any KSA gaps or other shortfalls indicated by the trainee's performance.

The RGC also has a portal computer system 282 for a user, i.e., an instructor, through which one can view a rendered image of the virtual environment and correlated data used in the application scene data. The portal 282 also provides a user interface that allows the instructor to place sensors in the virtual environment. The portal exports data for use in the computations of the RGC 279.

Also as shown in FIG. 19, the system preferably has a learning management system (LMS) 283 thereon. The LMS is connected with one or more dashboards, which are user interface systems that allow administrators to interact with the system and trainees. Generally, the LMS subscribes to all systems on the network, and communicates with them using http protocols and a browser or bridge 287 that accesses the DDS network using web protocol language and data. The LMS typically is accessed by a trainee in a training station, and provides the trainee with a webpage with a log-in to ascertain at first who the trainee is. The LMS typically retains historical data of all training for the system and for the individual trainees. When the trainee has logged in or otherwise identified the trainee and the training needed, the LMS publishes student data to the Rules Processor 255 that causes the Rules Processor to initiate training of the individual.

The system uses an Integrated Content Environment (ICE) identified at 289 in FIG. 18 to streamline design and efficiency. This is a virtualized infrastructure supporting all the tools necessary for training development. The ICE system includes the graph database as a central feature, and its structure aids in the integration of the ICE. By describing nodes, relationships, properties and labels using a predetermined limited set of model or template structures, the structure of the stored data is always known, even when the specific data values are not. All of the database tools and interfaces are designed to efficiently interact with the data-model structure of the graph database. This allows all the developed tools and interface to operate on any data "domain" defined within the graph.

Access to all development and run-time systems is preferably provided from a single location. Common toolsets are promoted through the Integrated Content Environment 289, minimizing tool version issues. Rollout of new tool versions is a single installation. Virtual machines providing specialized services can be spun-up on demand and the virtual network (DDS) between systems outperforms physical networks. Immersive emulation and testing environments can be constructed virtually, drastically reducing hardware configuration costs. Development collaboration is encouraged, because all developers use a comment set of resources. Notwithstanding this, remote users have the same access as local users.

ICE maintains various types of data (training data, source data, results data, etc.), and promotes access to and distribution of that data. The addition of a data tracking/catalog system (ICEAM) creates a unique cradle-to-grave unified environment. An ICE Asset Manager (ICEAM) is used to manage digital assets. A storage cloud is used to efficiently house the assets. MD5 checksums are used to identify unique assets and implement deduplication. Best fit algorithms attempt to fill volumes and reduce the number of volumes used in storage searches. A relational database is used to house asset metadata. The system is inherently distributed by using .NET User Controls within Internet Explorer. Collection support allows groups of assets to be related. Automated processing is configured to operate on collections. Interrogation Plug-Ins can be added to the system by users to automate metadata extraction from user provided asset types. Users can define their own metadata attributes. Users can also define 'personalities' sets of attributes which should automatically be applied to certain data sets or types.

It will be understood that virtualization may allow for the reconfiguration of many of the functionalities of the systems herein disclosed. The specific hardware and software may be modified while still retaining the functionality and benefits of the system. Moreover, it will be understood that a fairly large number of training stations, including simulation systems, may be supported together at the same time on the DDS networked system described here.

In addition, while a networked system with a single rule engine has been shown here, it is possible to have a system with a number of rules engines, each having rules for a specific function in the system. For example, a system might have a separate rules engine for each simulator on the system. The multiple rules engines may be supported on separate computer systems, or on a single system, as e.g., virtual machines on a hypervisor running on a computer system connected with the network. Moreover, the rules engines described herein have been given names such as the IDME or the SLRP which are descriptive of the rules that may be loaded in them, and are not intended to be in any way limiting the flexibility of usage of the rules engine.

The terms used herein should be viewed as terms of description rather than of limitation, as those who have skill in the art, with the specification before them, will be able to make modifications and variations thereto without departing from the spirit of the invention.

What is claimed is:

1. A system for training a student, said system comprising:
a training station configured to interact with the student, said training station displaying output to the student via at least one output device and receiving input via at least one input device;
a computer system connected with the training station by a network;
said computer system having a rules engine operative thereon and computer accessible data storage operatively associated therewith and storing the electronically accessible data that includes:
learning object data comprising a plurality of learning objects each configured to provide interaction with the student at the training station, and
rule data defining a plurality of rules accessed by the rules engine, said rules data including, for each rule, respective if-portion data defining a condition of data stored in said data storage and then-portion data defining an action to be performed at the training station when said condition is present in said data stored in said data storage, and
training data associated with the training station that is modified based on data transmitted over the network from the training station to the computer system;
wherein, for at least some of said rules, the respective condition of data defines a condition of training data, and the respective action includes output of a respective one of the learning objects so as to interact with the student; and
said rules engine causing the computer system to perform the action substantially immediately when the condition of data is present in the data in the data storage; and
wherein communications software restricts communication over the network to the computer system such that the computer system receives over the network only data packets published by computers on the network to which the computer system subscribes, and said computer system subscribes to said training station and receives data packets published by said training station;
wherein the data packets each includes a respective data field defining a topic name thereof that is transmitted only to other computers on the network that have subscribed to receive said data packets having data fields defining one or more specified topic names; and
wherein a learning management computer connected with the network supports a learning management system, said learning management computer subscribing to a first topic transmitted from the training station, and the rules engine computer system subscribing to a second topic transmitted by the learning management system, such that the training station communicates student data about the student to the learning management system, and the learning management system transmits data to the rules engine computer system that satisfies the if-portions of one or more of the rules so that the rules management computer system causes the training station to provide to the student learning objects based on the student data.

2. The system according to claim 1,
wherein some of the learning objects each comprise respective training output data configured so as to provide a respective training output video displayed to the student at the training station on a display device or training output audio played to the student at the simulation station by a sound output device; and
wherein the data storage device or devices store student state data including data indicative of learning objects that have been output to the student, said data being updated on completion of output of the respective learning object; and
wherein the rule data defines at least one of said rules with a data condition that the data indicates that the training output data of a first prerequisite of said learning objects has been output to the student, and an action that causes the training station to provide the training output data of a second advanced learning object to the student; and
wherein the data condition of the predetermined level is a data flag value that is set to one of two values before output and another of the two values after output is completed.

3. The system according to claim 1,
wherein the data storage also stores objective data defining respective acceptable inputs that are to be made by the student at the training station during training;

wherein the training data includes performance data of the student; and wherein the computer system has an assessment module that makes a determination of a training level of the student based on the objective data and actual inputs of the student at the training station determined from data transmitted over the network, and updates the performance data of the student stored in the data storage based on said determination;

wherein the assessment module comprises a set of assessment rules that are part of the rules data, said assessment rules having if-portions defining data conditions including data regarding presentation of learning objects that contain a test question or operational scenario the reaction to which is indicative of the training level of the student, and wherein the rule data includes a rule that has an if-portion with a data condition that the performance data of the student is below a predetermined acceptable threshold, and a then-portion with an action that includes outputting one of the learning objects to the student at the training station, where said learning object includes remedial training output relating to the performance data;

wherein the performance data is a KSA assessment and the remedial training learning object is selected from a plurality of remedial training learning objects based on a KSA gap indicated by the performance data, said remedial training learning objects each configured to remediate a gap in, respectively, knowledge, skill and ability.

4. The system according to claim 3, wherein the training output data includes audio and video that is output through a display device and an audio sound system of the training station, and wherein the video includes a display of a human avatar and the audio includes a speaking voice of the avatar; and wherein the training station further comprises a haptic output device.

5. The system according to claim 1, wherein the training station comprises a simulation station that simulates a vehicle, and the rules initiate an action of one of the learning objects that output virtual data that is displayed on a screen in the training station so that the screen displays virtual controls of the vehicle, and input can be entered by the student by touching the screen and interacting with the virtual controls thereby; and wherein the rules also initiate an action of another learning object that causes the training station to display to the student an out-the-window view rendered in real time on a display screen of the simulation station corresponding to a simulated view from a calculated virtual location of the simulated vehicle in a virtual environment identified by the learning object data simulation initiated responsive to an action initiating the learning object.

6. The system according to claim 2, wherein the student state data includes biometric data derived from monitoring the student with one or more input devices, and wherein the rules include one or more rules that initiate actions responsive to a data condition wherein the biometric data indicates circumstances for a break, circumstances indicating that the student is not being presented with adequately difficult objectives, or circumstances that the student is being presented with objectives that are too difficult, and said actions include starting a learning object offering the student a break, or starting learning objects that increase or reduce the difficulty of the training; and wherein the biometric data is provided by an eye tracker, a microphone, a respiration sensor, sensors capable of detecting posture of the student, or one or more brain sensors.

7. The system according to claim 1, wherein the data received from the training station is performance data reflective of a KSA assessment of the student, and said received data as stored satisfies the if-portion of one of said rules, the then-portion of said one of said rules causing the training station to provide remedial training learning objects based on a KSA gap indicated by the performance data configured to remediate the KSA gap.

8. The system according to claim 1, wherein the training station subscribes to data published by the rules engine computer system and receives data published thereby over the network, said published data causing the training station to take action in training the student.

9. The system according to claim 1, wherein the computer accessible data storage supports a graph database, said graph database storing data according to a data model wherein the graph database has nodes and relationships that are created from predetermined template structures that constrain the relationships or properties that can be given to nodes being created or modified by a user using a computerized graph database editor system.

10. The system according to claim 1, wherein the training station is a simulator having scene data stored therein defining a three-dimensional virtual environment in which the trainee or a virtual simulated vehicle operated by the trainee moves so as to have a location in the virtual environment defined by location data;

the simulator publishing data including the location data over the network;

a relative geometry computer system connected with the network and having storage storing at least some of the scene data content, said relative geometry computer system subscribing to the location data and receiving said location data;

the relative geometry computer system determining a proximity of the trainee or trainee vehicle in the virtual environment to a virtual sensor or a degree of deviation of the trainee or trainee vehicle from an ideal path based on the location data and the scene data content;

the relative geometry computer system publishing analysis data reflective of the proximity or degree of deviation on the network; and the rules engine receiving the analysis data and determining therefrom a remedial course of training where the proximity or degree of deviation satisfy predetermined prerequisites therefor.

11. A method for providing computerized training to a student, said method comprising:

providing a training station connected via a network with a computer system with computer-accessible data storage supporting a rules engine thereon;

storing lesson data in the data storage so as to be accessed by the rules engine, said lesson data comprising learning object data defining a number of learning objects that each, when activated by the rules engine, cause the training station to output visual imagery, audio or other output, and rules data defining a plurality of rules on which the rules engine operates so as to administer the computerized training, said rules each having a data condition part and an action part, the data condition part defining a state of data in the data storage that, when present, causes the rules engine to direct the computerized system to take a predetermined action, at least some of said actions comprising activating at least some of the learning objects to interact with the student at the training station;

storing student state data in the data storage, said student state data including data defining an assessment measure of training of the student derived from data transmitted over the network from the training station to the computer system;

providing the computerized training to the student at the training station with the rules engine administering the training according to the rules stored in the data storage;

determining repeatedly or continually the assessment measure for the student based on input received from the student at the training station;

storing the determined assessment measure in the student state data;

wherein the rules data defines at least one rule that initiates the action thereof when a data condition that the student state data in the data storage defines an assessment measure below a predetermined value is present, the action including initiating operation on the training station of one of the stored learning objects; and wherein the network connecting the training station and the computer system with the rules engine operates pursuant to stored communications software data that controls the communication on the network such that computers on the network publish data on the network, and each computer on the network receive only data that is published by other computers on the network to which the receiving computer subscribes;

wherein said rules engine computer system subscribes to data published by said training system and receives data therefrom; and wherein training-related data stored in the computer accessible data storage of the rules-engine computer system is determined responsive to data received over the network from the training station by said subscription, and wherein one or more of the rules of the rules engine computer system has a data condition part defining a state of said training-related data;

wherein a learning management computer connected with the network supports a learning management system, said learning management computer subscribing to the training station, and the rules engine computer system subscribing to the learning management system, and said method further comprising transmitting student data about the student over the network from the training station to the learning management system;

transmitting data derived based on the student data over the network from the learning management system to the rules engine computer system that satisfies the data condition parts of one or more of the rules; and transmitting over the network from the rules management computer system to the training station training data based on the respective action parts of the one or more rules that causes the training station to provide to the student learning objects identified based on the student data.

12. A method according to claim 11, wherein the student state data includes data identifying any of the learning objects that the student has completed.

13. A method according to claim 11, wherein the data stored in the data storage includes objective data that includes data defining input that should be received from the student interacting with the training station if training of the student is effective; and the assessment measure of the student including a determination of knowledge, skill and ability of the student in an instructional area;

the assessment measure including a determination of a KSA gap between the determined knowledge, skill and ability of the student and a level of knowledge, skill and ability defined by the objective data, and storing of data indicative of said KSA gap in the student state data;

said determination including providing computerized output a learning object to the student and processing a reaction input or absence of reaction input from the student, said output comprising media presenting a test question output to the student, and the reaction input comprising an answering input, or the output comprising a presentation of an simulated condition of a simulated vehicle requiring the student to react by providing control input, the control input comprising an input in simulated vehicle control panel or cockpit;

wherein the rules engine has one or more rules that, responsive to a condition of the data indicative of said KSA gap, initiates remedial action comprising initiating one of the learning objects so as to output media content stored in the learning object to the student, the rules data including a plurality of rules each having a respective remedial action and a respective if-portion initiating the associated remedial action based on a different assessment of the KSA gap for the student in regard to the instructional area;

wherein one of said plurality of rules, when the KSA gap data shows a gap in knowledge, activates a knowledge-directed remedial learning object, another of said rules, when the KSA gap data shows a gap in skill, activates a skill-directed remedial learning object, and a third of said rules, when the KSA gap data shows a gap in ability, activates an ability-directed remedial learning object, in sequential priority.

14. The method according to claim 11, wherein at least some of the learning objects include data defining video or audio media to be output to the student via the simulation station, or data defining virtual controls configured to be output on one or more interactive devices in the training station so that the training station may be employed to emulate different vehicles for different lessons.

15. The method according to claim 11, wherein at least one of the learning objects when initiated causes the simulation station to display imagery generated in real-time by an image generator of the computer system using a virtual environment identified by the learning object and showing a view thereof from a position of the student in said virtual world.

16. The method of claim 11, and further comprising receiving over the network at the learning management computer system data indicative of a new student at the training station; and transmitting second student data to the simulation station so as to be stored in the data storage so that the second student can be trained at the training station.

17. The method according to claim 11,
wherein the data transmitted over the network includes data packets each including a respective data field defining a topic name thereof that is transmitted only to other computers on the network that have subscribed to receive said data packets having data fields defining one or more specified topic names.

18. The method according to claim 17, wherein the data received from the training station is performance data reflective of a KSA assessment of the student, and
the rules engine, responsive to said received performance data as stored indicating a KSA gap and satisfying the data condition part of one of said rules, pursuant to the action part of said one of said rules causing the training station to provide remedial training learning objects configured to remediate the KSA gap.

19. The method according to claim 17, wherein the training station subscribes to data published by the rules engine computer system and receives data published thereby over the network, said published data causing the training station to take action in training the student.

20. The method according to claim 11, and further comprising storing system data for a system of record for all computers on the network in a computer accessible data storage connected with a computer connected with the network, the system data being stored in a graph database, said graph database storing data according to a data model wherein the graph database has nodes and relationships that are created from predetermined template structures that constrain the relationships or properties that can be given to nodes being created or modified by a user using a computerized graph database editor system.

21. The method according to claim 11, wherein the training station is a simulator having scene data stored therein defining a three-dimensional virtual environment in which the trainee or a virtual simulated vehicle operated by the trainee moves so as to have a location in the virtual environment defined by location data;
publishing data including the location data from the simulator over the network;
receiving said location data at a relative geometry computer system connected with the network and subscribing to the location data, said relative geometry computer system having storage storing at least some of the scene data content;
determining at the relative geometry computer system, based on the location data and the scene data content, a proximity of the trainee or trainee vehicle in the virtual environment to a virtual sensor or a degree of deviation of the trainee or trainee vehicle from an ideal path;
publishing analysis data reflective of the proximity or degree of deviation from the relative geometry computer system on the network; and
receiving the analysis data at the rules engine and determining therefrom a remedial course of training where the proximity or degree of deviation satisfy predetermined prerequisites therefor.

\* \* \* \* \*